(12) United States Patent
Itoh et al.

(10) Patent No.: US 8,218,762 B2
(45) Date of Patent: Jul. 10, 2012

(54) ENCRYPTING APPARATUS FOR COMMON KEY CIPHER

(75) Inventors: Kouichi Itoh, Kawasaki (JP); Souichi Okada, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1213 days.

(21) Appl. No.: 11/941,663

(22) Filed: Nov. 16, 2007

(65) Prior Publication Data

US 2009/0003598 A1  Jan. 1, 2009

(30) Foreign Application Priority Data

Nov. 16, 2006 (JP) ................................. 2006-310716

(51) Int. Cl.
*H04L 9/00* (2006.01)
*H04L 9/32* (2006.01)
*H04K 1/00* (2006.01)
*H04L 9/06* (2006.01)
*H04L 9/10* (2006.01)
*G09C 1/00* (2006.01)

(52) U.S. Cl. ............... 380/46; 380/28; 380/44; 713/168

(58) Field of Classification Search .................... 380/46, 380/28, 44; 713/168
See application file for complete search history.

(56) References Cited

U.S. PATENT DOCUMENTS

| 2002/0006196 A1* | 1/2002 | Shimoyama et al. ........... 380/44 |
| 2003/0048903 A1 | 3/2003 | Ito et al. |
| 2006/0236102 A1* | 10/2006 | Golic ............................ 713/168 |
| 2007/0071235 A1* | 3/2007 | Fujisaki et al. ................. 380/28 |
| 2007/0140478 A1* | 6/2007 | Komano et al. ................. 380/28 |

FOREIGN PATENT DOCUMENTS

| EP | 1172964 A2 * | 1/2002 |
| JP | 2002-91296 A | 3/2002 |
| JP | 2002-366029 | 12/2002 |

(Continued)

OTHER PUBLICATIONS

Sarah M. Diesburg, Christopher R. Meyers, David M. Lary, An-I Andy Wang;"When cryptography meets storage"; Oct. 2008; StorageSS '08: Proceedings of the 4th ACM international workshop on Storage security and survivability; Publisher: ACM; pp. 11-20.*

(Continued)

*Primary Examiner* — Eleni Shiferaw
*Assistant Examiner* — Courtney Fields
(74) *Attorney, Agent, or Firm* — Fujitsu Patent Center

(57) ABSTRACT

The first route selection device re-arrays a plurality of extended key mask values at random according to the value of a random number generated by a random number generation device. An extended key operation device generates an exclusive logical OR of a plurality of the re-arrayed extended key mask values, a data string representing extended key and an input data string. The second route selection device re-arrays the data string of the exclusive logical OR by performing a re-array conversely with the first route selection device according to the value of the random number. A non-linear conversion device applies non-linear conversion to the re-arrayed data string and outputs a data string masked by a plurality of non-linear conversion mask values. The third route selection device re-arrays the masked data string by performing the same re-array as the first route selection device according to the value of the random number.

18 Claims, 38 Drawing Sheets

FOREIGN PATENT DOCUMENTS

| | | |
|---|---|---|
| JP | 2005-134477 A | 5/2005 |
| JP | 2005-527853 | 9/2005 |
| JP | 2007-96973 A | 4/2007 |
| JP | 2007-186959 A | 7/2007 |
| WO | 03/101020 | 12/2003 |
| WO | WO-2005/025124 A1 | 3/2005 |

OTHER PUBLICATIONS

Thomas S. Messerges, Ezzy A. Dabbish and Robert H. Sloan, "Power Analysis Attacks of Modular Exponentiation in Smartcards," Cryptographic Hardware and Embedded Systems (CHES' 99), Springer-Verlag, 1999; pp. 144-157.

Paul Kocher, Joshua Jaffe, and Benjamin Jun, "Differential Power Analysis," Proceedings of Advances in Cryptology-CRYPTO'99, Springer-Verlag, 1999; pp. 388-397.

S. Chari, C. Jutla, J. R. Rao, P. Rohatgi, "A Cautionary Note Regarding Evaluation of AES Candidates on Smart-Cards," Second Advanced Encryption Standard Candidate Conference, 1999; pp. 1-15.

"Federal Information Processing Standards Publication 197", [online], [retrieval on Oct. 2, 2007], internet <URL: http://csrc.nist.gov/publications/fips/fips197/fips-197.pdf>JP.

T.S. Messerges, Ezzy A. Dabbish and Robert H. Sloan, "Investigations of Power Analysis Attacks on Smartcards," Proceedings of USENIX Workshop on Smartcard Technology, 1999.

Takeshi Shimoyama, Hitoshi Yanami, Kazuhiro Yokoyama, Masahiko Takenaka, Kouichi Itoh, Jun Yajima, Naoya Torii and Hidema Tanaka, "The Block Cipher SC2000," Fast Software Encryption (FSE 2001), LNCS vol. 2 355, 2002; pp. 312-327.

M. Akkar, R. Bevan, P. Dischamp and D. Moyart, "Power Analysis, What is Now Possible . . . ", ASIACRYPT 2000, pp. 489-502.

Thomas S. Messerges, "Securing the AES Finalists Against Power Analysis Attacks," Proceedings of Fast Software Encryption workshop 2000, Springer-Verlag, 2000; pp. 150-164.

Japanese Office Action mailed Oct. 4, 2011 for corresponding Japanese Application No. 2006-310716, with Partial English-language Translation.

Ito et al., "DPA countermeasure by randomizing the data order of Sbox input/output", Proceedings of the 2007 Symposium on Cryptography and Information Security, CD-ROM, 3E4-1, pp. 1-5, Jan. 23, 2007, with Partial English-language Translation.

Shimizu, "A Countermeasure against Side Channel Attack using Mask Logic Elements", Technical Report of IEICE, vol. 104, No. 315, pp. 15-19, Sep. 10, 2004, with Partial English-language Translation.

* cited by examiner

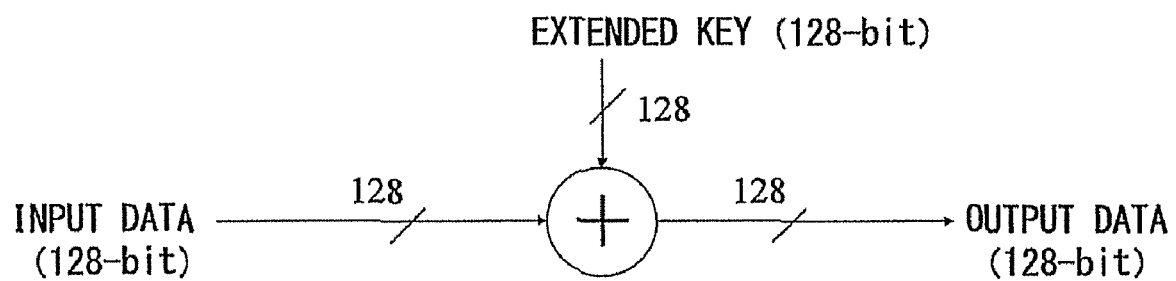
F I G. 3

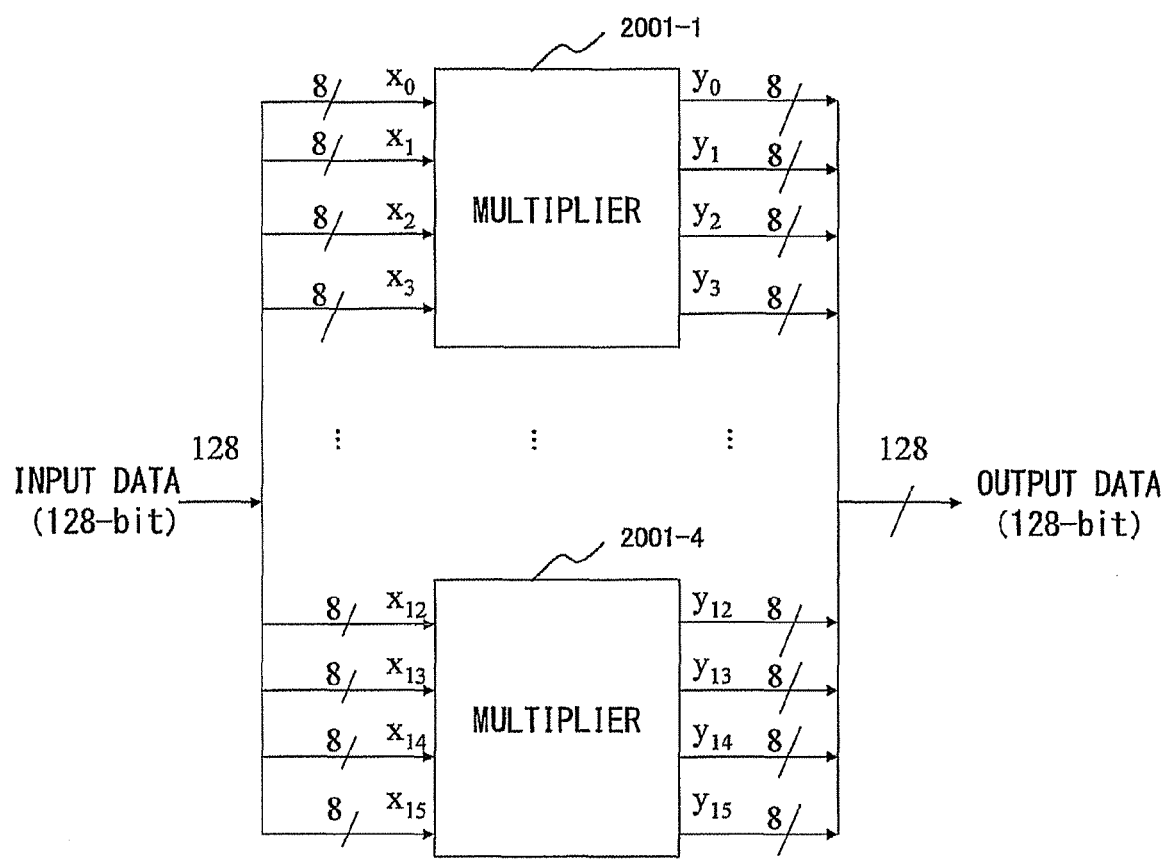
F I G. 6

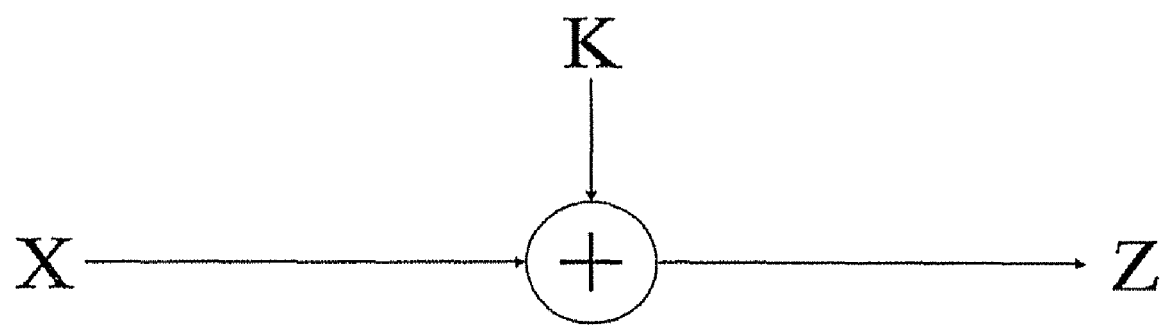
F I G. 7

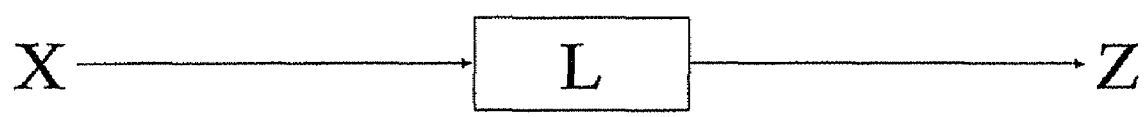
F I G. 8

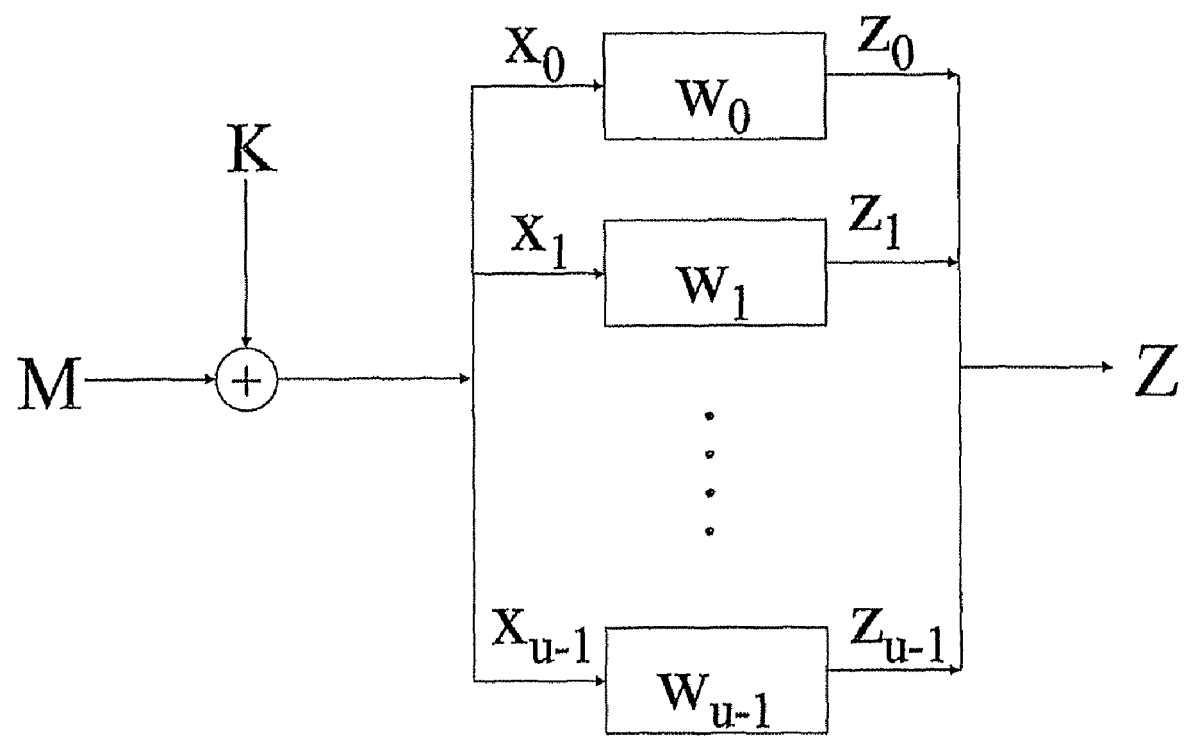
F I G. 10

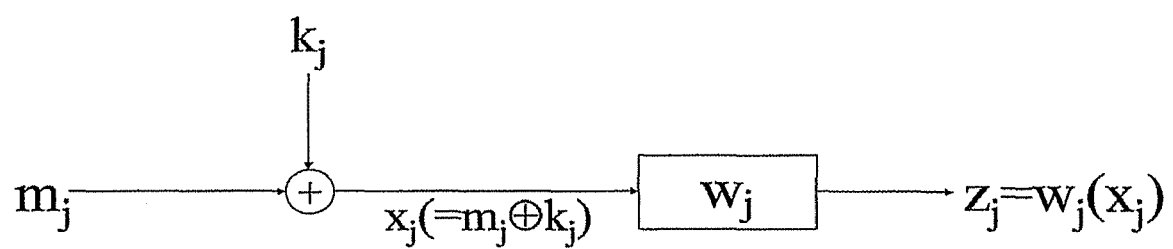
F I G. 1 1

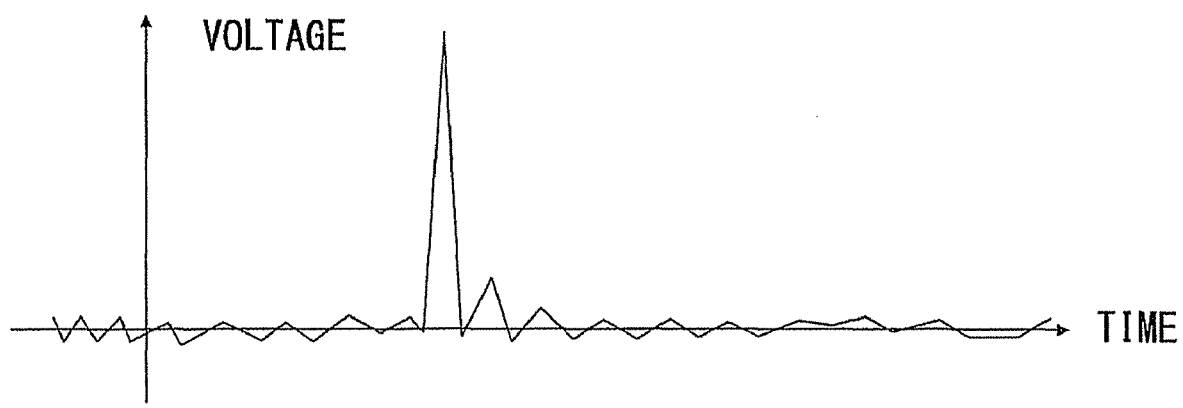
F I G. 1 3

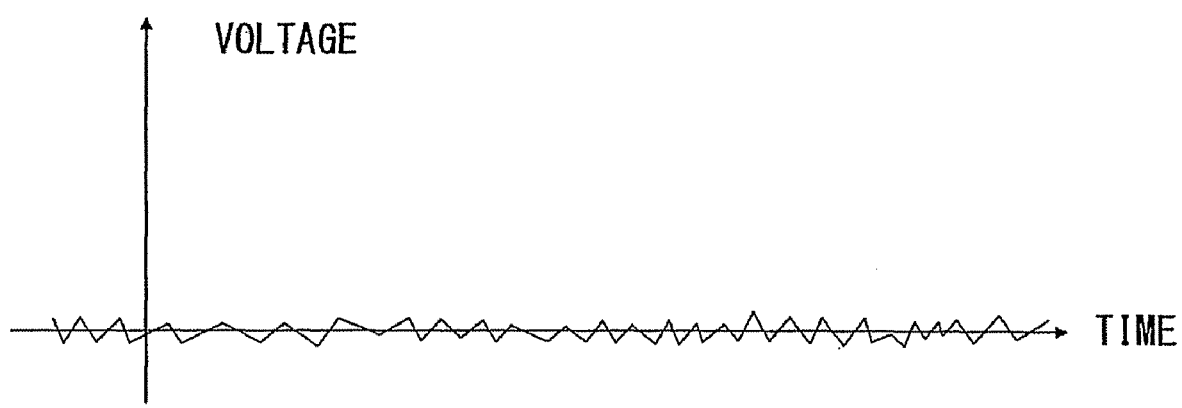
F I G. 14

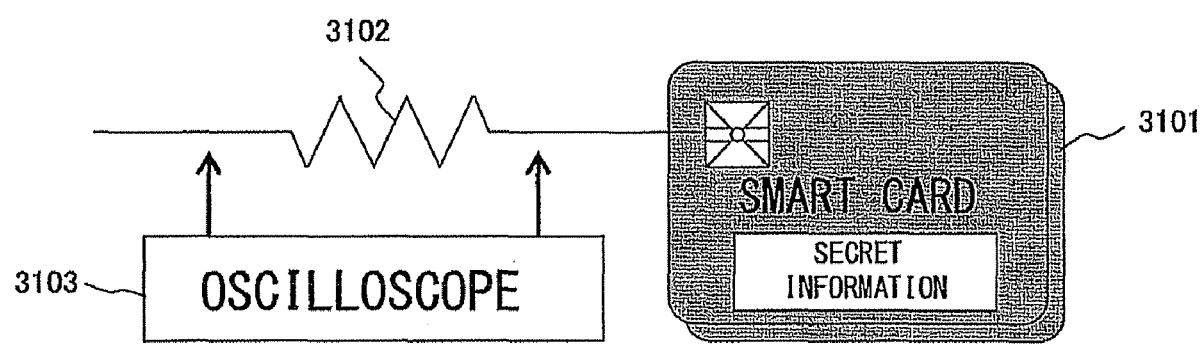
F I G. 1 7

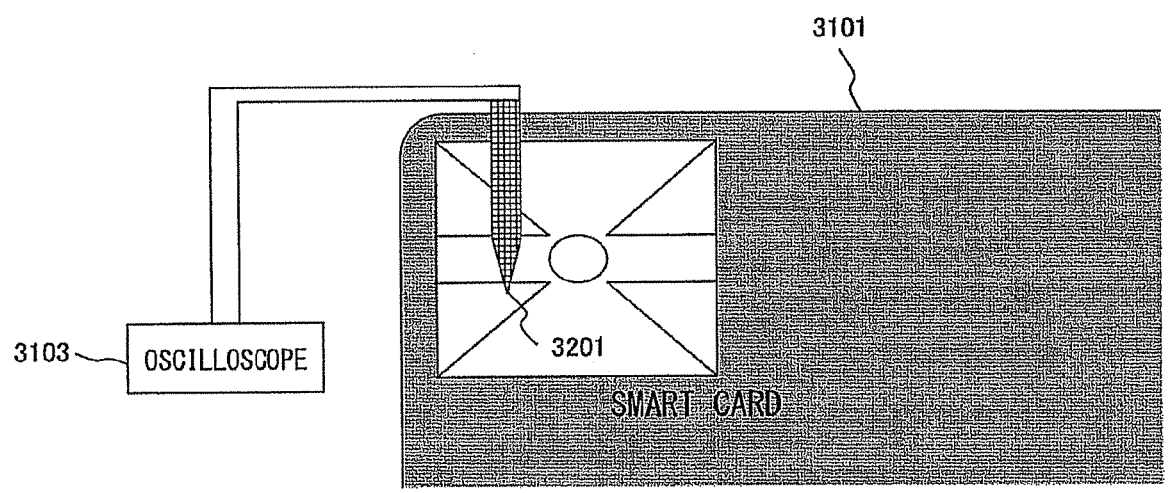
F I G. 18

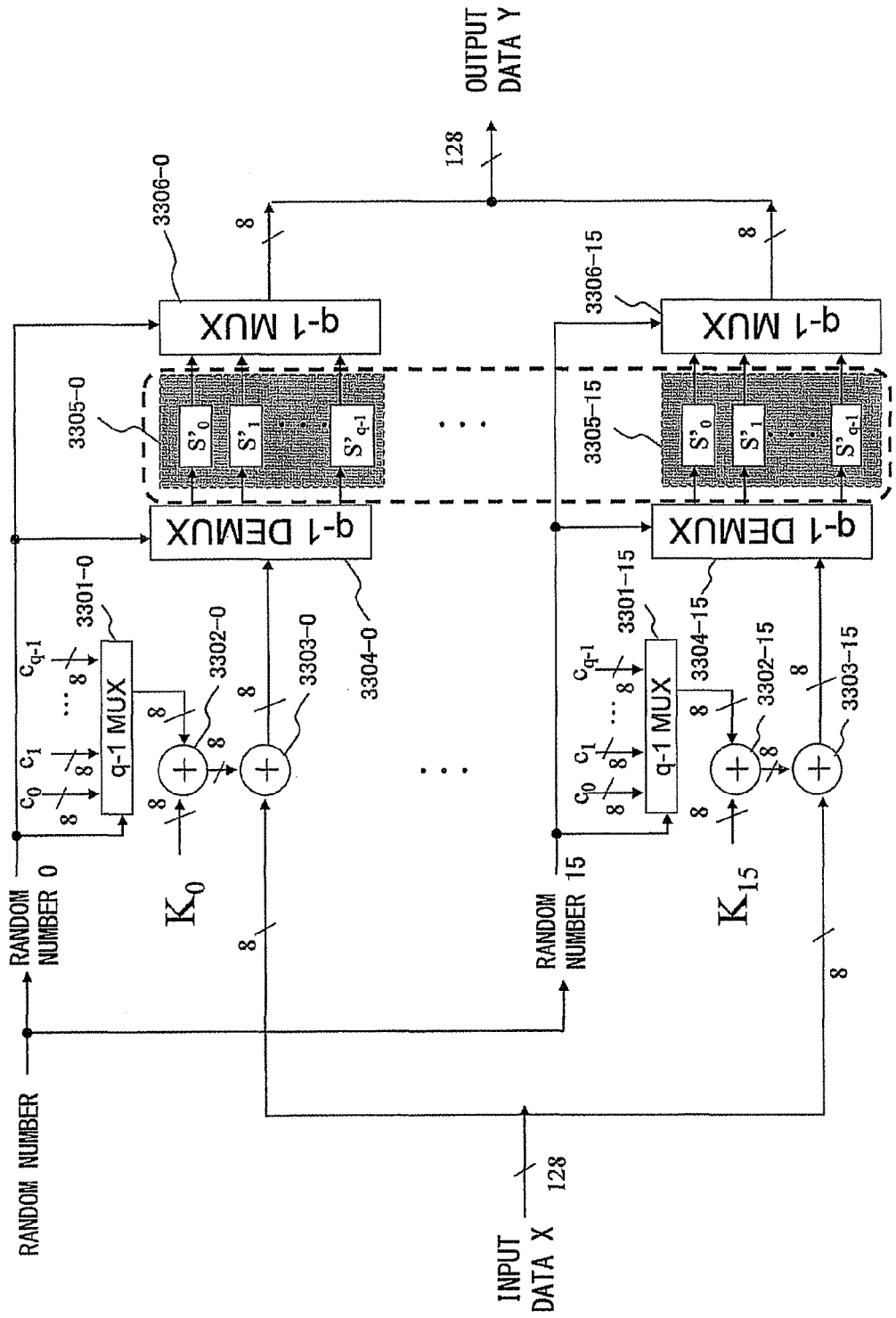
F I G. 19

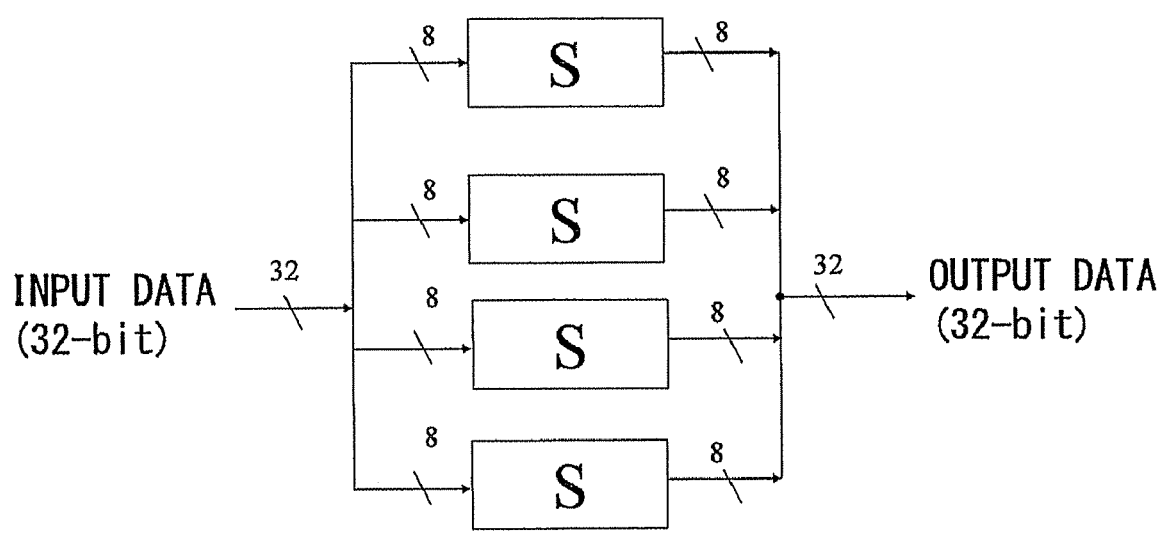
F I G. 20

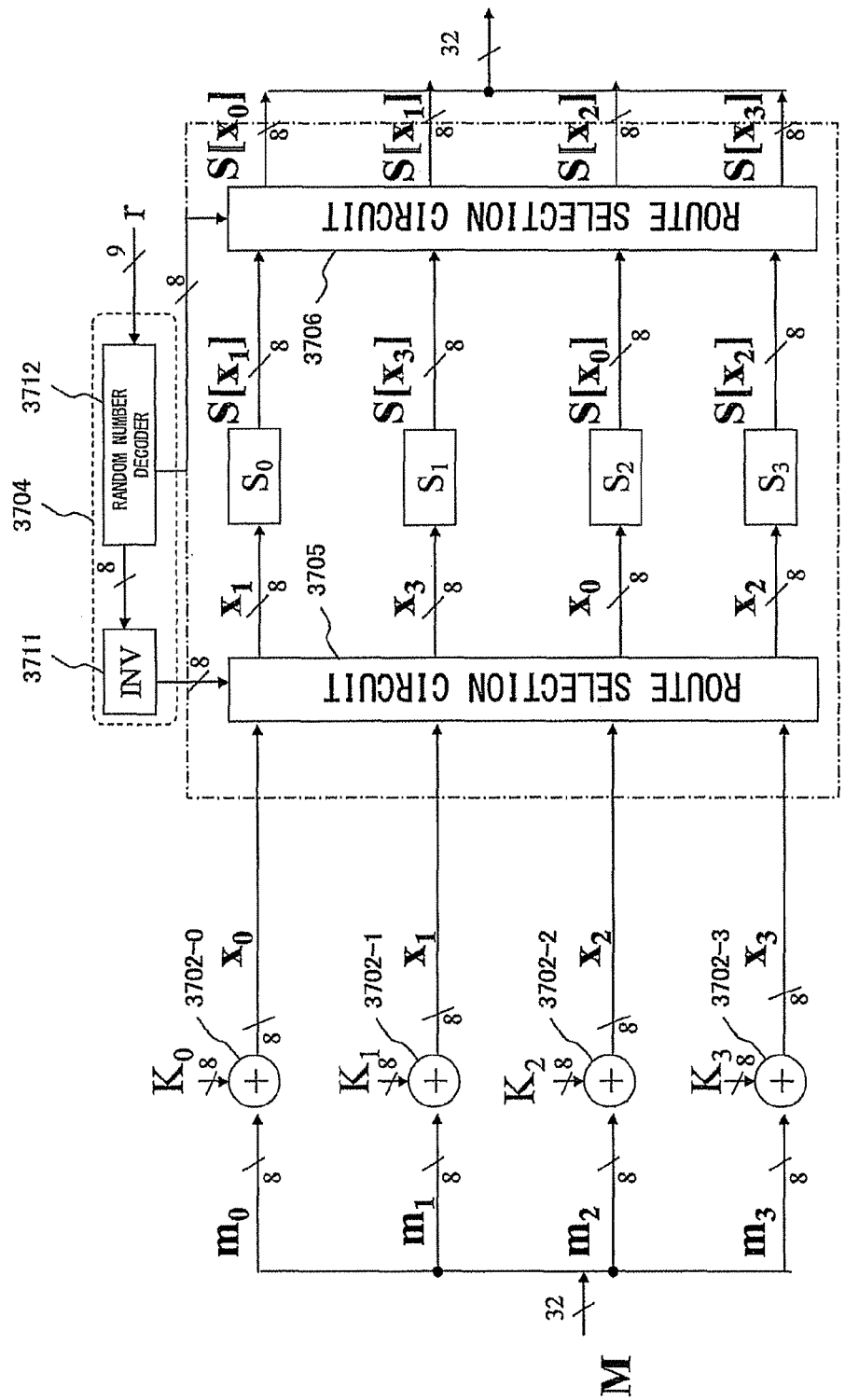
F I G. 24

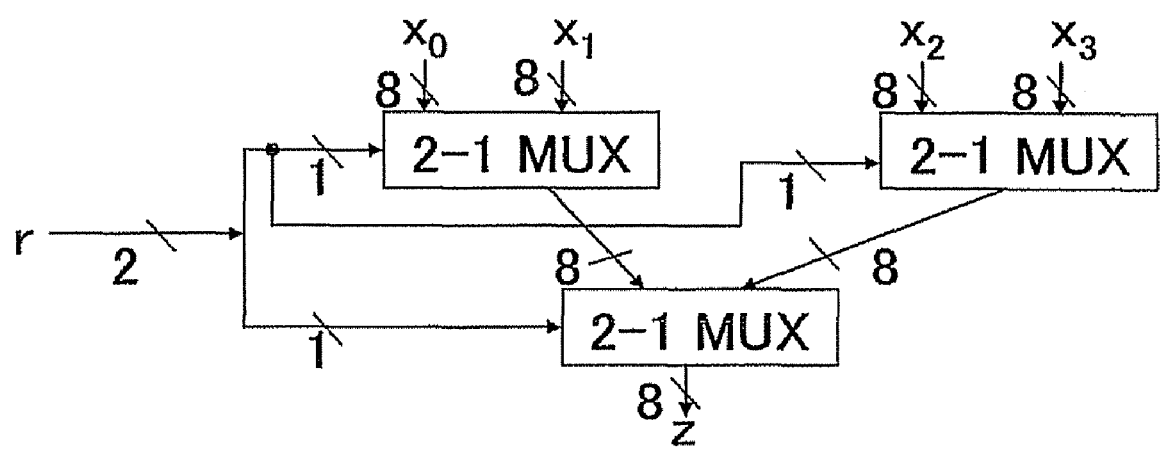
F I G. 2 9

FIG. 32

| $r_0r_1r_2r_3r_4r_5$ | ORDER OF OUTPUT DATA | | | |
|---|---|---|---|---|
| 000000 | $x_2$ | $x_1$ | $x_3$ | $x_0$ |
| 000001 | $x_2$ | $x_1$ | $x_0$ | $x_3$ |
| 000010 | $x_2$ | $x_3$ | $x_0$ | $x_1$ |
| 000011 | $x_3$ | $x_1$ | $x_2$ | $x_0$ |
| 000100 | $x_3$ | $x_1$ | $x_0$ | $x_2$ |
| 000101 | $x_3$ | $x_2$ | $x_0$ | $x_1$ |
| 000110 | $x_3$ | $x_2$ | $x_1$ | $x_0$ |
| 000111 | $x_1$ | $x_2$ | $x_0$ | $x_3$ |
| 001000 | $x_1$ | $x_2$ | $x_3$ | $x_0$ |
| 001001 | $x_1$ | $x_3$ | $x_0$ | $x_2$ |
| 001010 | $x_1$ | $x_3$ | $x_2$ | $x_0$ |
| 001011 | $x_1$ | $x_0$ | $x_3$ | $x_2$ |
| 001100 | $x_3$ | $x_0$ | $x_1$ | $x_2$ |
| 001101 | $x_1$ | $x_0$ | $x_2$ | $x_3$ |
| 001110 | $x_2$ | $x_3$ | $x_1$ | $x_0$ |
| 001111 | $x_2$ | $x_3$ | $x_0$ | $x_1$ |

| $r_0r_1r_2r_3r_4r_5$ | ORDER OF OUTPUT DATA | | | |
|---|---|---|---|---|
| 010000 | $x_0$ | $x_1$ | $x_3$ | $x_2$ |
| 010001 | $x_0$ | $x_1$ | $x_2$ | $x_3$ |
| 010010 | $x_0$ | $x_3$ | $x_1$ | $x_2$ |
| 010011 | $x_0$ | $x_3$ | $x_2$ | $x_1$ |
| 010100 | $x_0$ | $x_2$ | $x_1$ | $x_3$ |
| 010101 | $x_0$ | $x_2$ | $x_3$ | $x_1$ |
| 010110 | $x_0$ | $x_1$ | $x_3$ | $x_2$ |
| 010111 | $x_0$ | $x_2$ | $x_3$ | $x_1$ |
| 011000 | $x_1$ | $x_0$ | $x_3$ | $x_2$ |
| 011001 | $x_1$ | $x_0$ | $x_2$ | $x_3$ |
| 011010 | $x_3$ | $x_0$ | $x_2$ | $x_1$ |
| 011011 | $x_3$ | $x_0$ | $x_2$ | $x_1$ |
| 011100 | $x_1$ | $x_0$ | $x_2$ | $x_3$ |
| 011101 | $x_1$ | $x_0$ | $x_3$ | $x_2$ |
| 011110 | $x_2$ | $x_0$ | $x_1$ | $x_3$ |
| 011111 | $x_2$ | $x_0$ | $x_3$ | $x_1$ |

| $r_0r_1r_2r_3r_4r_5$ | ORDER OF OUTPUT DATA | | | |
|---|---|---|---|---|
| 100000 | $x_2$ | $x_0$ | $x_3$ | $x_1$ |
| 100001 | $x_2$ | $x_0$ | $x_1$ | $x_3$ |
| 100010 | $x_2$ | $x_0$ | $x_3$ | $x_1$ |
| 100011 | $x_2$ | $x_3$ | $x_2$ | $x_0$ |
| 100100 | $x_3$ | $x_3$ | $x_0$ | $x_1$ |
| 100101 | $x_3$ | $x_0$ | $x_2$ | $x_1$ |
| 100110 | $x_3$ | $x_0$ | $x_1$ | $x_2$ |
| 100111 | $x_3$ | $x_2$ | $x_1$ | $x_0$ |
| 101000 | $x_0$ | $x_2$ | $x_3$ | $x_1$ |
| 101001 | $x_0$ | $x_2$ | $x_1$ | $x_3$ |
| 101010 | $x_3$ | $x_2$ | $x_0$ | $x_1$ |
| 101011 | $x_3$ | $x_2$ | $x_1$ | $x_0$ |
| 101100 | $x_0$ | $x_3$ | $x_2$ | $x_1$ |
| 101101 | $x_0$ | $x_3$ | $x_1$ | $x_2$ |
| 101110 | $x_2$ | $x_3$ | $x_0$ | $x_1$ |
| 101111 | $x_2$ | $x_3$ | $x_1$ | $x_0$ |

| $r_0r_1r_2r_3r_4r_5$ | ORDER OF OUTPUT DATA | | | |
|---|---|---|---|---|
| 110000 | $x_1$ | $x_0$ | $x_3$ | $x_2$ |
| 110001 | $x_1$ | $x_1$ | $x_2$ | $x_3$ |
| 110010 | $x_1$ | $x_3$ | $x_2$ | $x_2$ |
| 110011 | $x_1$ | $x_3$ | $x_0$ | $x_0$ |
| 110100 | $x_1$ | $x_3$ | $x_2$ | $x_3$ |
| 110101 | $x_1$ | $x_0$ | $x_2$ | $x_2$ |
| 110110 | $x_1$ | $x_0$ | $x_3$ | $x_3$ |
| 110111 | $x_0$ | $x_2$ | $x_3$ | $x_0$ |
| 111000 | $x_0$ | $x_1$ | $x_3$ | $x_2$ |
| 111001 | $x_3$ | $x_1$ | $x_2$ | $x_3$ |
| 111010 | $x_3$ | $x_1$ | $x_0$ | $x_2$ |
| 111011 | $x_0$ | $x_1$ | $x_2$ | $x_3$ |
| 111100 | $x_0$ | $x_1$ | $x_3$ | $x_2$ |
| 111101 | $x_2$ | $x_1$ | $x_3$ | $x_2$ |
| 111110 | $x_2$ | $x_1$ | $x_0$ | $x_3$ |
| 111111 | $x_2$ | $x_1$ | $x_3$ | $x_0$ |

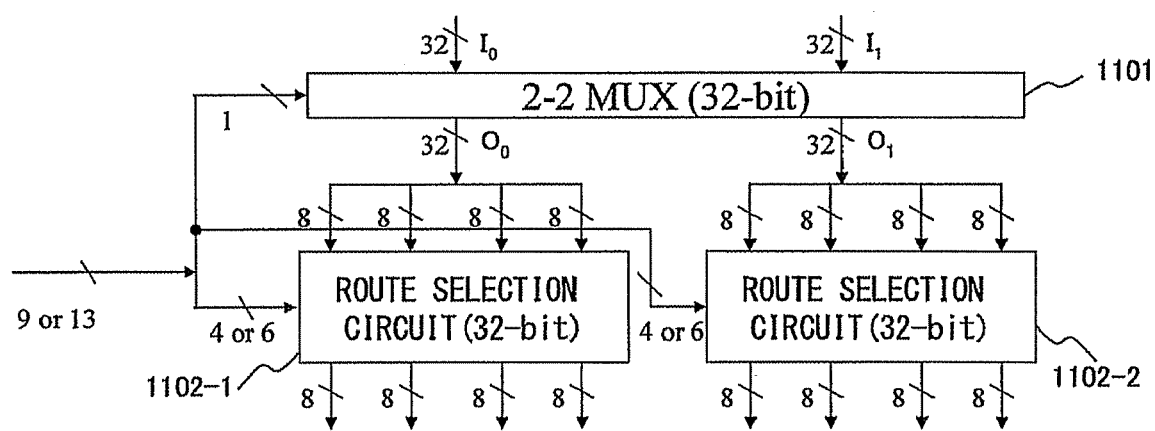
F I G. 3 5

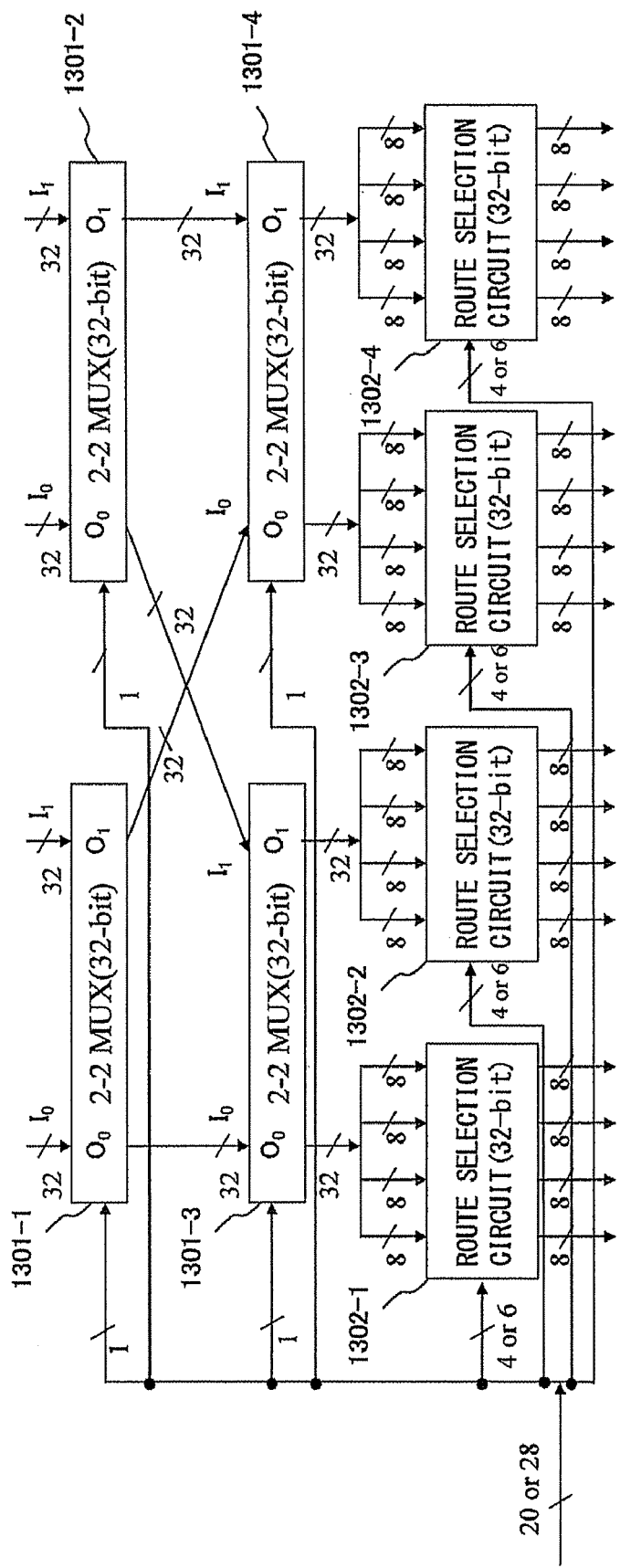
F I G. 37

|  | CONVENTIONAL METHOD 1 | CONVENTIONAL METHOD 2 | CONVENTIONAL METHOD 3 | THE PRESENT INVENTION (FIGS. 27 AND 34) | THE PRESENT INVENTION (FIGS. 31 AND 34) | THE PRESENT INVENTION (FIGS. 31 AND 34) | THE PRESENT INVENTION (FIGS. 35 AND 36 AND 37) |
|---|---|---|---|---|---|---|---|
| PROBLEM 1 | UNSOLVED | SOLVED | SOLVED | SOLVED | SOLVED | SOLVED | SOLVED |
| PROBLEM 2 | — | UNSOLVED | SOLVED | SOLVED | SOLVED | SOLVED | SOLVED |
| PROBLEM 3 | SOLVED | SOLVED | UNSOLVED | SOLVED | SOLVED | SOLVED | SOLVED |
| PROBLEM 4 | — | — | UNSOLVED | SOLVED | SOLVED | SOLVED | SOLVED |
| REMARKS | — | — | — | THE SCALE OF THE ROUTE SELECTION CIRCUITS IS 2/3 OF THAT OF CONVENTIONAL METHOD 3. | THE SCALE OF THE ROUTE SELECTION CIRCUITS IS THE SAME AS THAT OF CONVENTIONAL METHOD 3. | THE SCALE OF THE ROUTE SELECTION CIRCUITS IS THE SAME AS THAT OF CONVENTIONAL METHOD 3. | — |

FIG. 38

ENCRYPTING APPARATUS FOR COMMON KEY CIPHER

BACKGROUND OF THE INVENTION

1. Field of the Invention

The present invention relates to a common key encrypting process and more particularly to an encrypting apparatus with countermeasures for preventing decoding by a method so-called "power analysis attack".

2. Description of the Related Art

An encrypting method is roughly divided into two of a public key cryptography and a common key cryptography. The public key cryptography uses different keys for encryption and decryption and ensures security by generally opening a key for encryption (public key) but opening a key for decrypting cipher text (private key) only to a receiver. However, the common key cryptography uses the same key for encryption and decryption (secret key) and ensures security using information unknown to a third party other than a transmitter and a receiver as this secret key.

There is one technology called "cryptanalysis" in the encryption field. The cryptanalysis is used to estimate private information, such as a private key or the like from available information, such as cipher text or the like and various methods are used for it. One method of them, which has been recently focused, is called "power analysis attack".

The power analysis attack is devised by Paul Kocher in 1998. The power analysis attack estimates key information inside the encryption processor by collecting/analyzing power consumption data generated when various pieces of data are inputted to an encryption processor built in equipment, such as a smart card or the like. It is known that both a private and secret key can be estimated from the encrypting processor in both public key cryptography and common key cryptography.

There are two types of simple power analysis (hereinafter called "SPA") and differential power analysis (hereinafter called "DPA") in the power analysis attack.

The SPA estimates a private or secret key on the basis of the features of single piece of power consumption data in the encryption processor. The DPA estimates a private or secret key by analyzing the difference among many pieces of power consumption data. Generally it is said that the DPA is stronger than the SPA.

The following Non-patent reference 1 discloses cryptanalysis for public key cryptography, such as Rivest-Shamir-Adleman (RSA) or the like by using SPA and DPA. Non-patent reference 2 discloses cryptanalysis using SPA and DPA for data encryption standards (DES) currently used as a standard in the common key cryptography. Non-patent reference 3 points out that Rijndael, which is common key cryptography that seems to be used as a standard in the next generation may be analyzed by using the DPA.

As described above, cryptanalysis using DPA as the power analysis is focused for the reason that it is especially effective and various analyzing methods are studied. Not only cryptanalysis but also countermeasure technology for preventing the analysis by DPA are developed and are focused as a technology important as much as cryptanalysis.

FIG. 1 shows the general configuration of the common key encrypting process. Generally, the common key encrypting process is composed of two processes of extended key generation 1501 and round processing 1502. In the extended key generation 1501, a plurality of pieces of data called "extended keys" (extended key 0, extended key 1, . . . , extended key N) are generated from an inputted secret key and they are outputted to the round processing 1502. When inputting these extended keys and plain text to the round processing 1502, conversion for encrypting is performed and cipher text is outputted.

As the algorithm of a typical common key encrypting, advanced encryption standards (AES) are known and are published as the standard Federal Information Processing Standards Publication 197 (FIPS197) of National Institute of Standards and Technology (NIST) in U.S.A (for example, see the following Non-patent reference 4).

FIG. 2 shows the configuration of AES. AES is an algorithm using 128 bits as an encrypting unit. Specifically, 128-bit cipher text is generated from 128-bit plain text. A secret key can be one of three types; 128, 192 or 256 bits.

Firstly, when performing extended key generation 1601, (N+1) 128-bit extended keys are generated from a secret key. The round processing 1602 of AES is composed of four types of Round Key 1611, Sub-byte 1612, Shift Row 1613 and Mix-Column 1614. The extended keys are used in the Round Key 1611 of these. When plain text is inputted to the round processing 1602, the processes, the Round Key 1611, the Sub-byte 1612, the Shift Row 1613 and the Mix-Column 1614 are repeated (N−1) times in this order.

Then, processes, Round Key 1615, Sub-byte 1616, Shift Row 1617 and Round Key 1618 are performed to output cipher text. The number N of times of repetition varies depending on the bit length of a secret key. When it is 128, 192 and 256 bits, N=10, 12 and 14, respectively.

In the Round Key process, as shown in FIG. 3, the exclusive logical OR (XOR) of 128 bits of input data and 128 bits of extended key is calculated and outputted as output data. In the Sub-byte process, as shown in FIG. 4, 128 bits of input data is converted into 128 bits of output data by the same 16 non-linear conversion tables (S-boxes) 1801-1~1801-16.

In the Shift Row process, as shown in FIG. 5, input data X composed of 16 8-bit data $x_j$ (j=0, 1, . . . , 15) is converted into output data X composed of 16 8-bit data $y_i$ (i=0, 1, . . . , 15) by the following equation.

$$y_i = x_j, j = 13i - 4 \pmod{16} \qquad (1)$$

In equation (1), (mod 16) indicates residue calculation modulo 16.

In the Mix-Column process, as shown in FIG. 6, output data composed of 16 pieces of 8-bit data $y_i$ is generated from input data composed of 16 pieces of 8-bit data $x_j$ (j=0, 1, . . . , 15). In this case, the following multiplication is performed using four multipliers 2001-1~2001-4.

$$\begin{pmatrix} y_{4i+3} \\ y_{4i+2} \\ y_{4i-1} \\ y_{4i} \end{pmatrix} = \begin{pmatrix} 02 & 03 & 01 & 01 \\ 01 & 02 & 03 & 01 \\ 01 & 01 & 02 & 03 \\ 03 & 01 & 01 & 02 \end{pmatrix} \begin{pmatrix} x_{4i+3} \\ x_{4i+2} \\ x_{4i-1} \\ x_{4i} \end{pmatrix} \qquad (2)$$

$i = 0, 1, 2$ and $3$

Equation (2) shows a calculation process operated by each of the four multipliers 2001-1~2001-4 included in the Mix-Column process shown in FIG. 6.

Next, a secret key analyzing method by DPA is described. The DPA is a method for analyzing a secret key by measuring power consumption of the round processing 1502 shown in FIG. 1. The configuration of a common key encrypting process for analyzing by using DPA is described below without limiting it to AES.

In a general common key encrypting method, round processing is configured by combining three of an extended key XOR process shown in FIG. 7, a linear conversion process shown in FIG. 8 and a non-linear conversion process shown in FIG. 9, and the round processing is repeatedly performed a plurality of times.

As shown in FIG. 7, the extended key XOR process outputs the XOR operation result Z of input data X and an extended key K. As shown in FIG. 8, the linear conversion process outputs Z that satisfies Z=L(X), to the input data X. If XOR operation is described $\oplus$, L indicates linear conversion that satisfies the flowing equation as to arbitrary X and Y.

$$L(X \oplus Y) = L(X) \oplus L(Y) \quad (3)$$

More specifically, the bit permutation process, such as the Shift Row process shown in FIG. 5, matrix operation, such as the Mix-Column process shown in FIG. 6 and the like correspond to L.

As shown in FIG. 9, the non-linear conversion process outputs Z that satisfies Z=W(X), to the input data X. In this case, W indicates non-linear conversion that does not satisfy the following equation (4) as to arbitrary X and Y.

$$W(X \oplus Y) = W(X) \oplus W(Y) \quad (4)$$

More specifically, it often realizes W by a non-linear conversion index called "S-box". In this case, input data X is divided into u pieces like $X=x_0 x_1 \ldots x_{u-1}$ and $z_j$ expressed by $z_j = w_j(x_j)$, using $w_j$ (j=0, 1, . . . , u-1) indicating an S-box is calculated. Then, they are combined again like $Z = z_0 z_1 \ldots z_{u-1}$ and the obtained data Z is outputted.

Next, a analyzing method applying DPA to a common key encrypting process obtained by combining the above-described processes is described. Here, as the simplest example, it is shown that an extended key K can be analyzed by applying DPA to the process shown in FIG. 10 obtained by combining the process shown in FIG. 7 and that shown in FIG. 9. The process shown in FIG. 10 is equivalent of a process obtained by combining the Round Key process in AES (FIG. 3) and the Sub-byte process (FIG. 4).

FIG. 11 shows a configuration obtained by extracting only bits related to the input/output of $w_j$ from the configuration shown in FIG. 10. In FIG. 11, it is assumed that $m_j$, $k_j$ and $w_j$ indicate a known value $m_j$, such as plain text or the like, an unknown value $k_j$, such as extended key, and a known S-box $w_j$. It is shown that an extended key $k_j$ can be estimated by DPA under this condition.

DPA is composed of two steps of the measurement of power consumption data and the analysis of an extended key using differential power. In the measurement of power consumption data, if an oscilloscope or the like is used, power consumption data consumed by an encrypting processor when specific plain text is inputted can be measured as the power consumption curve shown in FIG. 12. Such a measurement is repeated while changing the value of plain text and when measurement data is obtained over sufficient times, the measurement is terminated. The aggregate of power consumption curves obtained in this series of measurements is assumed to be G.

Next, the analysis of an extended key using the power consumption curve is described. Firstly, as to an extended key $k_j$ used inside the encrypting process it is assumed that $k_j=k'_j$. Since $m_j$ and $w_j$ are already known, the aggregate G can be classified into the following two types of $G_0(k'_j)$ and $G_1(k'_j)$, on the basis of this $k'_j$ assumption.

$$G_0(k'_j) = \{G | \text{the } e\text{-th bit value of } z_j = w_j(m_j \oplus k'_j) = 0\} \quad (5)$$

$$G_1(k'_j) = \{G | \text{the } e\text{-th bit value of } z_j = w_j(m_j \oplus k'_j) = 1\} \quad (6)$$

Then, the following differential power curve $DG(k'_j)$ is generated.

$$DG(k'_j) = (\text{Average of power consumption curve belonging to aggregate } G_1) - (\text{Average of power consumption curve belonging to aggregate } G_0) \quad (7)$$

If this assumption is correct, that is, $k'_j = k_j$, a spike shown in FIG. 13 appears on the differential power curve $DG(k'_j)$. If this assumption is wrong, that is, $k'_j \neq k_j$, the differential power curve $DG(k'_j)$ becomes a flat curve with no spikes as shown in FIG. 14. Therefore, if the differential power curve shown in FIG. 13 is obtained from assumed $k'_j$, the extended key $k_j$ can be analyzed.

If such $k_j$ analyzing is applied to each j, lastly, the extended key K shown in FIG. 10 can be analyzed. By repeatedly applying this analysis to the extended key 0, the extended key 1, . . . , the extended key N, the secret key can be decoded. In the case of AES, since the leading value of an extended key is the value of the secret key value without performing any process from the nature of the algorithm, the entire secret key can be analyzed if the extended key 0 is analyzed when the secret key is 128 bits and if the extended keys 0 and 1 are analyzed when the secret key is 192 or 256 bits.

Next, the reason why spikes appear on the differential power curve $DG(k'_j)$ when $k'_j = k_j$ is described. If $k'_j = k_j$, as to $z_j$, the following equation holds true by classifying G into $G_0(k'_j)$ and $G_1(k'_j)$ according to equations (5) and (6).

$$(\text{Average Hamming weight of } z_j \text{ belonging to } G_1) - (\text{Average Hamming weight of } z_j \text{ belonging to } G_0) = 1 \quad (8)$$

If $k'_j \neq k_j$, equation (8) does not hold true. In this case, since random classification is performed, the following equation holds true.

$$(\text{Average Hamming weight of } z_j \text{ belonging to } G_1) - (\text{Average Hamming weight of } z_j \text{ belonging to } G_0) = 0 \quad (9)$$

In the above equation, the Hamming weight is the number of a bit value '1' included in a bit array when a specific value is expressed by the bit array. For example, the Hamming weight of a bit value $(1101)_2$ is 3.

When equation (8) holds true, there is a difference in the average Hamming weight of a load value $z_j$ between $G_1(k'_j)$ and $G_0(k'_j)$. However, when equation (9) holds true, there is no difference in the average Hamming weight of a load value $z_j$ between $G_1(k'_j)$ and $G_0(k'_j)$.

Generally it is considered that power consumption is in proportion to the Hamming weight of a data value. The following Non-patent reference 5 shows an experimental result indicating that this is correct. Therefore, if $k'_j = k_j$, the difference of power consumption appears on the differential power curve as a spike since equation (8) is satisfied. However, in the case of equation (9), no spikes appear and the differential power curve becomes flat.

Although so far DPA applied to the simplest configuration shown in FIG. 10 has been described, it is found that such a analyzing method is effective even when the linear conversion shown in FIG. 8 is inserted.

FIG. 15 shows the generalized configuration shown in FIG. 10 and two linear conversion processes $L_1$ and $L_2$ are inserted before and after the extended key XOR process. For example, if a function for outputting input without performing any process, a bit permutation function and an S-box called "B function of SC2000" are $L_1$, $L_2$ and $w_j$, respectively, FIG. 15 shows a configuration equivalent of SC2000.

The following Non-patent reference 6 discloses the specification of SC2000. Since $L_2$ is a bit permutation function, the process shown in FIG. 15 can be converted into the same process shown in FIG. 11 if it is a configuration obtained by extracting only bits related to the input/output of $w_j$. Therefore, the extended key K can be decoded using the same DPA as described above.

Although in the above-described method, the S-box output in the non-linear process is focused and DPA is applied, besides it, a method of focusing the value immediately after the XOR operation of the input $m_j$ and the key $k_j$ (output value of extended key XOR process) and the value of the value $x_j$ inputted to the S-box and applying DPA is known (for example, see the following Non-patent reference 7).

If the above descriptions are put in order, a secret key can be analyzed by DPA when the following conditions are met.

DPA-1: If the input M is known and controllable, the key K is unknown and fixed, and the conversion of the $w_j$ of the S-box is known, the secret key K can be analyzed by measuring the power consumption curve of the part A shown in FIG. 16 (output of the $w_j$ of the S-box).

DPA-2: If the input M is known and controllable, the key K is unknown and fixed, the secret key K can be analyzed by measuring the power consumption curve of the part B shown in FIG. 16 (writing of the output value of the extended key XOR process).

DPA-3: If the input M is known and controllable, the key K is unknown and fixed, the secret key K can be analyzed by measuring the power consumption curve of the part C shown in FIG. 16 (loading of an input value in order to index the $w_j$ of the S-box).

The following Patent reference 1 also discloses these DPA attack conditions.

As the power consumption measurement method for applying DPA, two methods are known. In one method, as shown in FIG. 17, a resistor 3102 is connected to the surface of a smart card 3101, and the voltage between both ends of the resistor 3102 is measured by an oscilloscope 3103. The other method, as shown in FIG. 18, measures power consumption by installing an electro-magnetic wave probe 3201 connected to the oscilloscope 3103 on the surface of the smart card 3101 and measuring an electro-magnetic wave leaked from the smart card 3101.

The method shown in FIG. 17 has an advantage that it requires an attacker of little labor since it is sufficient to simply attach a resistor to the surface of the card. However, since it measures the power consumption of the entire card, it also measures power consumption not related to the encrypting process, which is a disadvantage.

The method shown in FIG. 18 has an advantage that its measurement accuracy is high since it can partially measure the power consumption of the card. For example, when the smart card 3101 comprises a central processing unit (CPU), random-access memory (RAM), read-only memory (ROM), an operator and an encrypting processor, the power consumption of the encrypting process can be intensively measured while suppressing the respective power consumption factors of the CPU, RAM, ROM and the operator at a low level by installing an electro-magnetic wave probe 3201 near the encrypting processor. This is because the nearer the location of the electro-magnetic wave probe 3201 is from the current source, the stronger the electro-magnetic wave becomes since the intensity of the electro-magnetic wave is in inverse proportion to the square of its distance from a current source.

By carefully selecting the location of the electro-magnetic wave probe 3201, the power consumption of only the round processing 1502 can also be measured, for example, without measuring the power consumption of the extended key generation 1501 shown in FIG. 1. However, since the power measurement experiments must be repeated a lot if times in order to find the optimal location of the electro-magnetic wave probe 3201, it takes a high time cost, which is a disadvantage.

Next, the conventional DPA countermeasures are described with reference to FIGS. 19-21. As the DPA countermeasures, there are a method of reducing the measurement accuracy of the amount of power consumption by inserting a noise generator in the smart card or the like and a method of applying countermeasures to the encrypting process and randomizing power consumption. The former can be easily implemented. However, since the key can be analyzed, for example, by using the power measurement method shown in FIG. 18, it cannot be its basic countermeasures. However, although the latter cannot be easily implemented, it can be its basic countermeasures.

As a typical method of randomizing power consumption, a method (hereinafter called "Conventional method 1") called "masking method" is known (for example, see the following Non-patent reference 8). If data to be calculated in the encrypting process without DPA countermeasures is M, in the Conventional method 1, the encrypting process is performed by calculating data M' and R expressed by the following equation instead of the data M.

$$M'=M\oplus R \quad (10)$$

In the above equation, R is a random number and is generated every time the encrypting process is performed. According to this method, the data M' is masked by XOR-operating the random value R for the data M of the encrypting process. Since power consumption can be randomized by randomizing data, the secure processing against DPA can be realized. Hereinafter, a value to be XOR-operated for data without DPA countermeasures is called "mask value". (In the above equation, R is mask value.)

Since in this method, the operation must be applied to each of two pieces of data, M' and R at each stage of the round processing, according to the value of the random number R, it has a problem that its process time is double or more, compared with the case where data M is directly calculated.

Problem 1: Since the calculation of the encrypting process must be duplicated, its process time is double or more.

The above-described Patent reference 1 discloses a method for solving this problem (hereinafter called "Conventional method 2"). While in Conventional method 1, a mask value is generated at random, in Conventional method 2, one is selected from a plurality of fixed values calculated in advance by a random number and is used as a mask value. If the selected mask value is expressed as $R_x$, in Conventional method 2, data $M'_x$ and $R_x$ that satisfy the following equation are calculated.

$$M'_x=M\oplus R_x \quad (11)$$

In the above equation, since $R_x$ is calculated in advance, there is no need to calculate both $M'_x$ and $R_x$ and it is sufficient to calculate only $M'_x$. Therefore, in Conventional method 2, there is no need to duplicate the calculation as in Conventional method 1, thereby realizing a high-speed process.

By using the DPA countermeasures of Conventional method 2, the encrypting process without DPA countermeasures shown in FIG. 10 can be replaced with the encrypting process shown in FIG. 19. FIG. 19 shows the configuration in which the process shown in FIG. 10 is regarded as the combination of the Round Key process and Sub-byte process in AES.

In FIG. 19, selectors 3301-j and 3306-j (j=0, 1, . . . , 15) ((q−1) MUX) selects one from q pieces of input data according to a random number and outputs it. A demultiplxer 3304-j (j=0, 1, ..., 15) ((q−1) DEMUX) outputs the inputted data to an output destination selected from q output destinations according to a random number.

An XOR operator 3302-j masks $K_j$ by calculating the XOR of $K_j$ extended keys $K_0$-$K_{15}$ divided every 8 bits and a value selected from constants $c_0$-$c_{q-1}$ by the selector 3301-j. The XOR operator 3303-j calculates the XOR of the masked extended key and the input data.

Then, a non-linear conversion process by an S-box circuit 3305-j is applied to the operation result of the XOR operator 3303-j. In this process, one is selected from q pieces of S-boxes ($S'_0[x]$-$S'_{q-1}[x]$) according to a random number, and the input data is converted using the S-box. The random number used for this selection is the same as the random number used to select the mask value of the extended key $K_j$.

Each of $S'_0[x]$-$S'_{q-1}[x]$ is masked with each of different constants $d_0$-$d_{q-1}$. Specifically, if an S-box without DPA countermeasures is $S[x]$, $S'_i[x]$ (i=0, 1, ..., q−1) is expressed as follows.

$$S'_i[x] = S[x \oplus c_i] \oplus d_i \qquad (12)$$

Since there is the demultiplexer 3304-j on the input side of the S-box circuit 3305-j and the selector 3306-j on the output side, the signal of the extended key XOR operation transmits only one of the q pieces of S-boxes. Since the respective logic of q pieces of S-boxes is different, its power characteristic is also different. Therefore, by selecting one from these by a random number, power consumption is randomized and the secure processing against DPA can be realized.

Since this method directly randomizes the power consumption of the round processing 1502 shown in FIG. 1, secure processing by both the power measurement methods shown in FIGS. 17 and 18 can be realized. However, the configuration shown in FIG. 19 requires q times of S-boxes without DPA countermeasures. Generally, since the circuit area of an S-box is very large, the DPA countermeasures shown in FIG. 19 have the following problem.

Problem 2: Since it requires q times of S-boxes without DPA countermeasures, its circuit area becomes large.

As a method for solving this problem, the DPA countermeasures disclosed by the following Patent reference 2 are known (hereinafter called "Conventional method 3"). This method randomizes the power consumption of the extended key generation 1501 shown in FIG. 1. In order to describe this mechanism, the extended key generation in AES, without DPA countermeasures is described below.

In the extended key generation in AES, a Sub-byte process is performed as in the round processing. In this case, as shown in FIG. 20, a Sub-byte process by a 32-bit unit is performed. In Conventional method 3, the circuit shown in FIG. 21 is used to randomize the power consumption of the Sub-byte process shown in FIG. 20.

The circuit shown in FIG. 21 comprises four S-boxes ($S_0$-$S_3$) and route selection circuits 3501 and 3502 for selecting the route of input data X according to a random number. 32-bit data X is divided into four pieces of 8-bit data $x_0$-$x_3$, which are inputted to the route selection circuit 3501. When they are inputted to the route selection circuit 3501, data is arranged in the order of $x_0$, $x_1$, $x_2$ and $x_3$. However, when they are outputted, this order is re-arrayed at random according to a random number. In FIG. 21, they are re-arrayed in the order of $x_1$, $x_3$, $x_0$ and $x_2$ when viewed from the highest-order bit.

After the data order is changed, each of S-box processes expressed as $S_0$-$S_3$ is applied to these pieces of data. Although these S-boxes are logically the same as S-boxes without DPA countermeasures, they are mounted in a physically different form each other. Therefore, their power consumption characteristics are different each other. For example, $S_0$ is mounted as a logical circuit, $S_1$ is mounted as static random-access memory (SRAM), $S_2$ is mounted as mask ROM and $S_3$ is mounted as flash ROM.

Specifically, since an S-box that processes data $x_j$ (j=0, 1, 2 and 3) is selected from $S_0$-$S_3$ at random, power consumption changes at random. Therefore, DPA security can be improved. After the calculation by an S-box is completed, the route selection circuit 3502 changes the data order and restores the order of data randomized when inputted to the S-box.

This configuration has an advantage that it is superior to the configuration without DPA countermeasures shown in FIG. 20 in the using efficiency of a circuit area. While in Conventional method 2 shown in FIG. 19, only one of q pieces of S-boxes is used for the encrypting process, in Conventional method 3, all S-boxes are used for the encrypting process thanks to the function of the route selection circuit. Therefore, Conventional method 3 can solve Problem 2 of Conventional method 2.

Patent reference 1: Japanese Patent Application Publication No. 2002-366029

Patent reference 2: Domestic publication of PCT International Patent Application No. 2005-527853

Non-patent reference 1: Thomas S. Messerges, Ezzy A. Dabbish and Robert H. Sloan, "Power Analysis Attacks of Modular Exponentiation in Smart Cards", Cryptographic Hardware and Embedded Systems (CHES '99), Springer-Verlag, pp. 144-157 (1999).

Non-patent reference 2: Paul Kocher, Joshua Jaffe and Benjamin Jun, "Differential Power Analysis", in proceedings of Advances in Cryptology-CRYPTO '99, Spring-Verlag, pp. 388-397 (1999).

Non-patent reference 3: Chari C. Jutla, J. R. Rao and P. Rohatgi, "A Cautionary Note Regarding Evaluation of AES Candidates on Smart-Cards", Second Advanced Encryption Standard Candidate Conference, February 1999.

Non-patent reference 4: "Federal Information Processing Standards Publication 197", [online], [retrieved Oct. 2, 2006], The Internet<URL: http://csrc.nist.gov/publications/fips/fips197/fips-197.pdf>

Non-patent reference 5: T. S. Messerges, Ezzy A. Dabbish and Robdert H. Sloan, "Investigations of Power Attacks on Smart Cards", in Proceedings of USENIX Workshop on Smart-Card Technology, May 1999.

Non-patent reference 6: Takeshi Shimoyama, Hitoshi Yanami, Kazuhiro Yokoyama, Masahiko Takenaka, Koichi Itoh, Jun Yajima, Naoya Toriii and Hidema Tanaka, "The Block Cipher SC2000", Fast Software Encryption (FSE 2001), pp. 312-327, LNCS vol. 2355 (2002)

Non-patent reference 7: M. Akkar, R. Bevan, P. Dischamp and D. Moyart, "Power Analysis, What Is Now Possible . . . ", ASIACRYPT 2000, pp. 489-502 (2000).

Non-patent reference 8: Thomas S. Messerges, "Securing the AES Finalists Against Power Analysis Attacks", in Proceedings of Fast Software Encryption Workshop 2000, Spring-Verlag, pp. 150-164 (2001).

The above-described DPA countermeasures of Conventional method 3 have the following two new problems. The first problem is as follows.

Problem 3: Since Conventional method 3 randomizes only the power consumption of extended key generation, DPA security is low. Specifically, although the method shown in FIG. 17 can prevent DPA from measuring the power consumption of the entire smart card, the method shown in FIG.

18 cannot prevent DPA from measuring the power consumption of a part of the circuit of a smart card.

As described above, DPA analyzes a secret key by measuring the power consumption of the round processing 1502 shown in FIG. 1. However, although Conventional method 3 can randomize the power consumption of the extended key generation 1502, it cannot randomize the power consumption of the round processing 1502.

Therefore, the security of DPA for measuring the power consumption of the entire smart card is high. However, the security of DPA for measuring the power consumption of the part of the smart card is low since only the power consumption of the round processing 1502 can be measured.

Conventional method 3 further has the following problem.

Problem 4: Since the route selection circuit of Conventional method 3 requires a circuit for generating a selection signal from an inputted random number in addition to a selector circuit and a demultiplexer circuit, its circuit scale becomes large.

In order to describe this problem, an example of the configuration of the route selection circuit of Conventional method 3 is shown in FIG. 22. FIG. 22 shows the configuration shown in FIG. 11 of the above-described Patent reference 2. It comprises a selection signal generation circuit 3601 and route selection circuits 3602 and 3603. The selection signal generation circuit 3601 comprises a random number decoder 3611 and an inverter circuit 3612. The route selection circuit 3602 comprises selectors (4-1 MUX) 3621-1~3621-4 and the route selection circuit 3603 comprises 4-input/1-output selectors 3622-1~3622-4.

A random number generator, which is not shown in FIG. 22, generates 9-bit random number. When this random number is inputted to the random number decoder 3611, the random number decoder 3611 outputs an 8-bit signal, This 8-bit signal is inputted to the route selection circuit 3602 as a selection signal. A 2-bit selection signal is assigned to each of the selectors 3621-1~3621-4 of the route selection circuit 3602. Each selector 3621-j (j=1, 2, 3 and 4) selects one from input signals $x_0$-$x_3$ according to this selection signal and outputs it.

In FIG. 22, the selectors 3621-1, 3621-2, 3621-3 and 3621-4 select $x_1$, $x_3$, $x_0$ and $x_2$, respectively. This selection operation is performed in such a way that an output signal may not overlap among the four selectors. This is because since if an output signal overlaps and, for example, selectors 3621-1, 3621-2, 3621-3 and 3621-4 select $x_0$, $x_3$, $x_0$ and $x_2$, respectively, the S-box process of $x_1$ is not performed, a normal encrypting result cannot be obtained.

For example, of the four selectors shown in FIG. 22, the selector 3621-1 selects input signal $x_1$, the other selectors 3621-2~3621-4 never selects input signal $x_1$.

It is by the function of the random number decoder 3611 that the overlap among $x_0$-$x_3$ can be avoided while generating a random selection signal according to a random number. Furthermore, the random number decoder 3611 also prevents the statistical bias of a random selection signal. Specifically, by enabling an S-box that processes $x_j$ to be selected from $S_0$-$S_3$ with equal probability 1/4, the statistical bias is prevented and the secure processing of DPA can be realized.

When $S_0$, $S_1$, $S_2$ and $S_3$ are applied to $x_1$, $x_3$, $x_0$ and $x_2$, respectively, as an S-box process, as a result, signals $z_1$, $z_3$, $z_0$ and $z_2$ are generated and inputted to the route selection circuit 3603.

The inverter circuit 3612 inverts the 8-bit signal outputted from the random number decoder 3611 and outputs the obtained signal to the route selection circuit 3603 as a selection signal. This selection signal is used to restore the order of the signal whose order the route selection circuit 3602 has changed at random to original one. Specifically, a selection signal for restoring the signal order from $z_1$, $z_3$, $z_0$ and $z_2$ to $z_0$, $z_1$, $z_2$ and $z_3$ is generated.

The 8 bits of the selection signal generated by the inverter circuit 3612 are divided into four of two bits and are one of them is inputted to each of the selectors 3622-1~3622-4. Thus, the selectors 3622-1~3622-4 select $z_0$, $z_1$, $z_2$ and $z_3$, respectively.

By adopting the configuration shown in FIG. 22, power consumption can be randomized without increasing the number of S-boxes. However, since in order to realize the secure processing of DPA, a random number cannot be directly inputted to the route selection circuits 3602 and 3603, the selection signal generation circuit 3601 comprising the random number decoder 3611 and the inverter circuit 3612 is needed. As a result, the above-described Problem 4 occurs.

It has been found that according to Problem 1, Conventional method 1 takes two times of processing time, according to Problem 2, Conventional method 2 requires q times of S-boxes, according to Problem 3, DPA is not effective on Conventional method 3 shown in FIG. 18 since it cannot randomize the power consumption of the round processing and according to Problem 4, Conventional method 3 requires a selection signal generation circuit. Therefore, a method for solving these problems simultaneously is studied below.

FIG. 23 shows the configuration of an encrypting circuit obtained by simply combining Conventional methods 2 and 3. This encrypting circuit comprises XOR operators 3701-0~3701-3 and 3702-0~3702-3, selectors 3703-0~3703-3, a selection signal generation circuit 3704, route selection circuits 3705 and 3706, and four Sboxes ($S_0$~$S_3$). The selection signal generation circuit 3704 comprises an inverter circuit 3711 and a random number decoder 3712.

The operations of the XOR operators 3701-j and 3702-j and selector 3703-j (j=0, 1, 2 and 3) are the same those of the XOR operators 3302-j and 3303-j and selector 3301-j shown in FIG. 19. The operations of the selection signal generation circuit 3704, route selection circuits 3705 and 3706 and $S_0$-$S_3$ are the same as those of the selection signal generation circuit 3601, route selection circuits 3602 and 3603 and $S_0$-$S_3$ shown in FIG. 22.

32 bits of data M are divided into four pieces of 8-bit data $m_0$-$m_3$ and are inputted to this encrypting circuit. Eight bits of extended key $K_0$-$K_3$ and random numbers $r_0$-$r_3$ and r are also inputted to it. If $x_j$ indicates the XOR of $m_j$ and $K_j$ and an S-box without DPA countermeasures is S, $S_j[X]=S[x]$. $c_{rj}$ indicates a mask value selected from constants $c_0$-$c_3$ by a random number $r_j$.

In order to solve Problem 3, in this configuration, the power consumption of each of the Round Key process and Sub-byte process in AES is randomized. The power consumption of the Round Key process is randomized by Conventional method 2 and that of the Sub-byte process is randomized by Conventional method 3. By using Conventional method 3 for the Sub-byte process in AES, Problem 2 can be also solved.

However, this configuration has a problem that it does not meet the data processing conditions of the mask method. As described as to Conventional method 2 shown in FIG. 19, the data processing conditions of the mask method is that calculated data T' can be expressed as follows, using a mask value $R_x$ selected by a random number.

$$T'=T \oplus R_x \quad (13)$$

If this $R_x$ is determined only by a random number without depending on T and T', T' can be simply restored to the original T according to the following equation after all AES encrypting process is completed.

$$T = T' \oplus R_x \quad (14)$$

If $R_x$ depends on T and T', $R_x$ must be dynamically calculated according to T'. Since calculation must be duplicated in order to perform this calculation, Problem 1 which Conventional method 2 should have essentially solved cannot be solved.

The reason why the configuration shown in FIG. 23 does not meet the data processing conditions of the mask method is that the Sub-byte process uses an unmasked S-box in the Round Key process although a constant selected by a random number performs a mask process. For example, if the Round Key process is applied to the eight highest-order bits $m_0$ of input data, $x_0 \oplus c_{r0}$ is outputted. In this case, $x_0 = m_0 \oplus K_0$.

Then, an S-box by $S_2$ is applied to the data $x_0 \oplus c_{r0}$ via the route selection circuit 3705 which changes data order according to a random number r, and $S_2[x_0 \oplus c_{r0}] = S[x_0 \oplus c_{r0}]$ is outputted. Then, the route selection circuit 3706 restores $S[x_0 \oplus c_{r0}]$ to the position of the highest 8 bits and the data is outputted. In this case, $S[x_0 \oplus c_{r0}]$ does not meet the data processing conditions of the mask method. This is because in $T' = T \oplus R_x$, although $T' = S[x_0 \oplus c_{r0}]$ and $T = S[x_0]$, $S[x_0 \oplus c_{r0}] = S[x_0] \oplus S[c_{r0}]$ is not satisfied and $R_x = S[c_{r0}]$ does not hold true since S is a non-linear conversion function. Specifically, $R_x$ is not only determined by random number $r_0$ but also is changed by the influence of data value $x_0$.

A configuration for solving this problem is shown in FIG. 24. FIG. 24 shows the configuration in which Conventional method 3 is applied to the Sub-byte process in the round processing of AES. The Round Key process is the same as that without DPA countermeasures.

Since in the Round Key process, a mask by $c_{rj}$ is not attached different from the configuration shown in FIG. 23, output data $S[x_0]$-$S[x_3]$ can be obtained against input data $m_0$-$m_3$. Therefore, a process equivalent of that in the case where $R_x = 0$ in $T = T' \oplus R_x$ can be realized.

However, in this configuration, although the power consumption of the Sub-byte process can be randomized, the power consumption of the Round Key process cannot be randomized. Specifically, although the power consumption of the input/output of the S-boxes indicated by C and A shown in FIG. 16 can be randomized, the power consumption of output of the XOR operation indicated by B cannot be randomized. Therefore, the security against DPA cannot be realized because of the weakness described as DPA-2.

Thus, by simply applying Conventional methods 2 and 3 to the round processing of AES, DPA countermeasures by which all the above-described Problems 1-4 can be solved cannot be realized.

SUMMARY OF THE INVENTION

It is an object of the present invention to provide an encrypting apparatus for capable of taking countermeasures against power analysis attacks, such as DPA and solving Problems 1-4 as much as possible in a common key encrypting process.

The encrypting apparatus comprises a random number generation device, a first route selection device, a second route selection device, a third route selection device, an extended key operation device and a non-linear conversion device and performs the encrypting process of a common key cipher.

The random number generation device generates a random number. The first route selection device re-arrays a data string composed of a plurality of extended key mask values for masking extended keys at random according to the value of the random number and outputs it. The extended key operation device generates the XOR of the plurality of extended key mask values outputted from the first route selection device, a data string representing the extended key and an input data string.

The second route selection device re-arrays the data string of the XOR by performing re-array conversely with the first route selection device according to the value of the random number. The non-linear conversion device converts the data string outputted from the second route selection device non-linearly and outputs a data string masked by a plurality of non-linear conversion mask values. The third route selection device re-arrays the data string outputted from the non-linear conversion device by performing the same re-array as the first route selection device according to the value of the random number and outputs it.

BRIEF DESCRIPTION OF THE DRAWINGS

FIG. 3 shows the Round Key process in AES;
FIG. 6 shows the Mix-Column process in AES;
FIG. 7 shows the extended key XOR process;
FIG. 8 shows the linear conversion process;
FIG. 10 shows a process obtained by combining the extended key XOR process and the non-linear conversion process;
FIG. 11 shows the part of the process of FIG. 10 for $w_j$;
FIG. 13 shows a first differential power curve;
FIG. 14 shows a second differential power curve;
FIG. 17 shows a first power measurement method;
FIG. 18 shows a second power measurement method;
FIG. 19 shows a configuration for selecting a mask value at random;
FIG. 20 shows the Sub-byte process in the extended key generation;
FIG. 24 shows the configuration of a second virtual encrypting circuit;
FIG. 29 shows the configuration of the selector.

FIG. 32 shows the output data order of the second configuration of the route selection circuit;

FIG. 35 shows the fourth configuration of the route selection circuit;

FIG. 37 shows the sixth configuration of the route selection circuit; and

FIG. 38 shows the effect of the present invention.

DETAILED DESCRIPTION OF PREFERRED EMBODIMENTS

The preferred embodiments of the present invention are described below with reference to the drawings.

Figure 25:
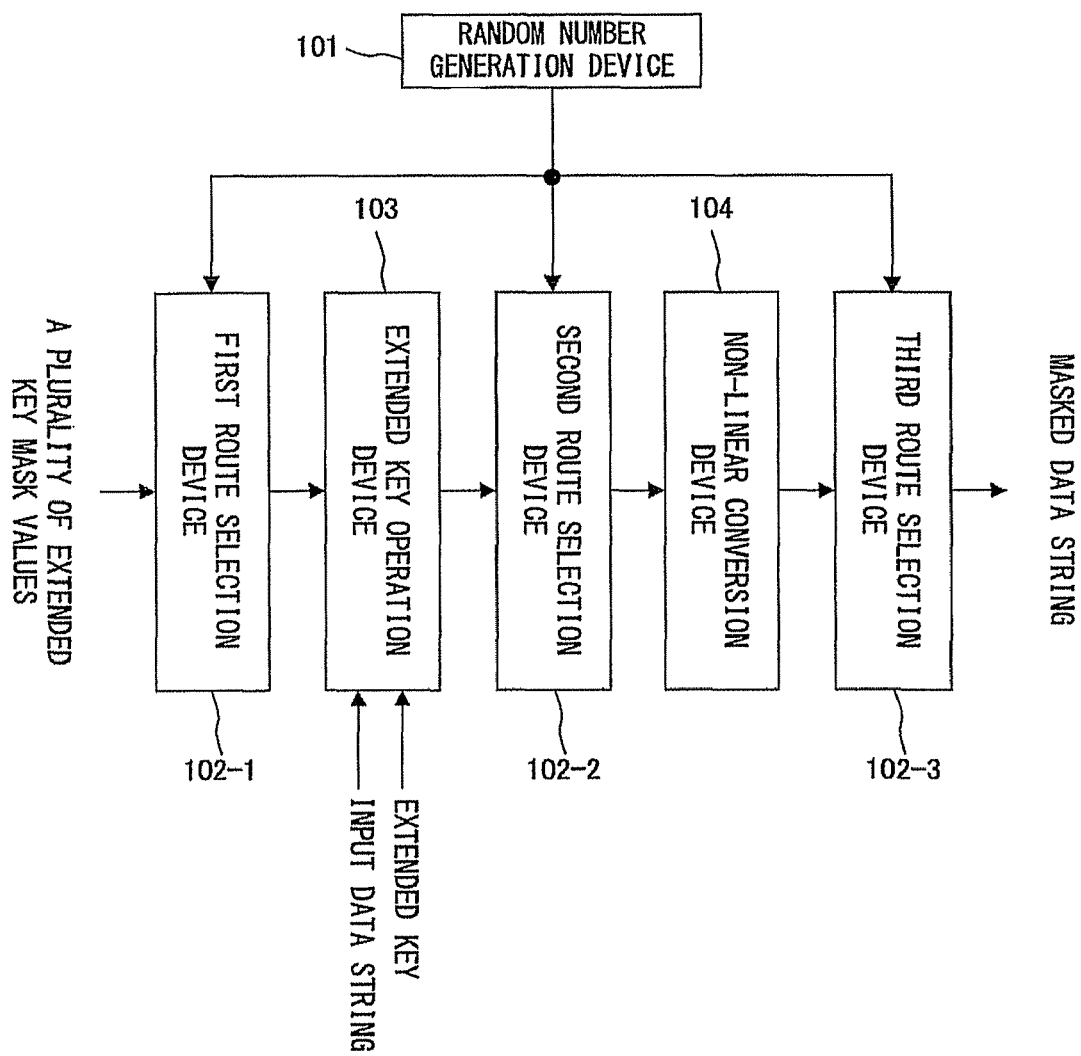
FIG. 25 shows the principle of the encrypting apparatus of the present invention.

FIG. 25 shows the principle of the encrypting apparatus of the present invention. The encrypting apparatus shown in FIG. 25 comprises a random number generation device 101, a first route selection device 102-1, a second route selection device 102-2, a third route selection device 102-3, an extended key operation device 103 and a non-linear conversion device 204 and performs the encrypting process of a common key cipher.

The random number generation device 101 generates a random number. The first route selection device 102-1 re arrays a data string composed of a plurality of extended key mask values for masking extended keys at random according to the value of the random number and outputs it. The extended key operation device 103 generates the XOR of the plurality of extended key mask values outputted from the first route selection device, a data string representing an extended key and an input data string.

The second route selection device 102-2 re-arrays the data string of the XOR by performing re-array conversely with the first route selection device according to the value of the random number. The non-linear conversion device 104 converts the data string outputted from the second route selection device 102-2 non-linearly and outputs a data string masked by a plurality of non-linear conversion mask values. The third route selection device 102-3 re-arrays the data string outputted from the non-linear conversion device 104 by performing the same re-array as the first route selection device 102-1 according to the value of the random number.

Since the second route selection device 102-2 performs re-array conversely with the first route selection device, in the data string inputted to the non-linear conversion device 104, the order of the plurality of extended key mask values inputted to the first route selection device 102-1 is maintained. Therefore, a non-linear conversion table with a mask which takes into consideration the influence of these extended key mask values in advance can be set in the non-linear conversion device 104 in advance.

In this case, if the non-linear conversion table with a mask is adjusted in such a way that $R_x$ of equation (13) can be determined only by a random number without depending on T and T', the data process conditions of the mask method can be met to solve Problem 1.

If such a non-linear conversion table with a mask is used, the data string outputted from the non-linear conversion device 104 indicates the XOR of a result obtained by converting the XOR of the data string outputted from the second route selection device 102-2 and the plurality of extended key mask values by a non-linear conversion table, and the plurality of non-linear conversion mask values.

Since the third route selection device 102-3 performs re-array in the same way as the first route selection device 102-1, specifically performs re-array conversely with the second route selection device 102-2, in the data string outputted from the third route selection device 102-3, the order of the data string inputted to the extended key operation device 103 is maintained. Therefore, there is no need to use such a large-scale S-box circuit shown in FIG. 19 and Problem 2 can be solved.

Since both the output of the extended key operation device 103 and the output of the non-linear conversion device 104 are masked by a mask value, Problem 3 can be solved. Furthermore, since the first route selection device 102-1, the second route selection device 102-2 and the third route selection device 102-3 are directly controlled by a random number from the random number generation device 101, no selection signal generation circuit is needed and Problem 4 can be solved.

The random number generation device 101, for example, corresponds to the random number generator 901 shown in FIG. 33, which is described later, and the first route selection device 102-1, the second route selection device 102-2 and the third route selection device 102-3, for example, correspond to the route selection circuits 203, 204 and 205, respectively, shown in FIG. 26, which is described later. The extended key operation device 103, for example, corresponds to XOR operators 201 and 202, and the non-linear conversion device 104, for example, corresponds to four S-boxes ($S'_0$-$S'_3$) with a mask.

According to the present invention, a secret key can be hardly decoded in the encrypting process including AES, which is a typical common key encrypting algorithm, thereby improving the security of built-in equipment, such as a smart card or the like.

Figure 26:
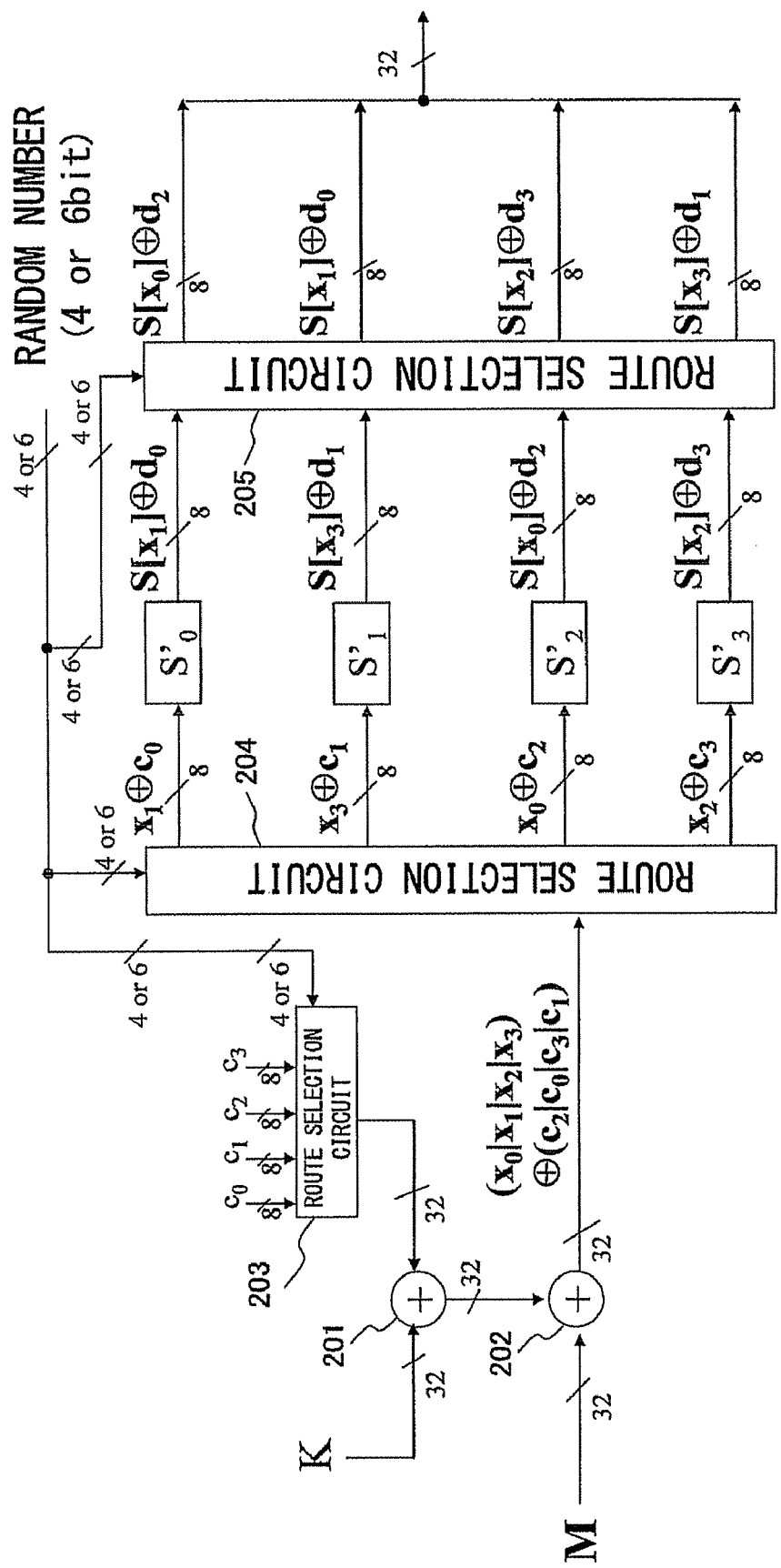
FIG. 26 shows the configuration of the encrypting circuit of the present invention.

FIG. 26 shows the configuration of the encrypting apparatus in which the DPA countermeasures of the present invention are applied to the Round Key process and the Sub-byte process in the round processing of AES. This encrypting circuit comprises XOR operators 201 and 202, route selection circuits 203, 204 and 205 and four S-boxes with a mask ($S'_0$-$S'_3$).

$S'_0$-$S'_3$ satisfy the following equation as to an S-box (S) without DPA countermeasures, respectively different constants $c_i$ and $d_i$ ($i$=0, 1, 2 and 3), like Conventional method 1.

$$S'_i[x]=S[x \oplus c_i] \oplus d_i \quad (15)$$

According to equation (15), the following equation holds true.

$$S'_i[x \oplus c_i]=S[x \oplus c_i \oplus c_i] \oplus d_i=S[x] \oplus d_i \quad (16)$$

By using respectively different constants $c_i$ and $d_i$ as mask values, four pieces of logic of an S-box with a mask can be generated to realize the randomization of power consumption.

The route selection circuit 203 is used to randomize the power consumption of the Round Key process, and route selection circuits 204 and 205 are used to randomize the power consumption of the S-box process in the Sub-byte process. The same random number is inputted to each of three route selection circuits 203-205, and the inputted random number is used as a selection signal without being processed. Although this random number is four or six bits, the bit length of the random number varies depending on a configuration.

Next, the operation of the encrypting circuit shown in FIG. 26 is described. 32-bit data M and a 32-bit extended key K are inputted to this encrypting circuit. If 32-bit data M is indicated by four pieces of 8-bit data $m_0$-$m_3$, and the extended key K is indicated by four 8-bit extended keys $K_0$-$K_3$, $x_j$ indicates the XOR of $m_j$ and $K_j$.

Firstly, a random number and four 8-bit mask values $c_0$-$c_3$ are inputted to the route selection circuit 203, the order of the mask values is changed at random according to the random number. In FIG. 26, $c_0$, $c_1$, $c_2$ and $c_3$ are re-arrayed in the order of $c_2$, $c_0$, $c_3$ and $c_1$, which are outputted to the XOR operator 201. The XOR operator 201 outputs the XOR of these mask values and the extended key K to the XOR operator 202 and the XOR operator 202 outputs the XOR of the output of the XOR operator 201 and the data M.

Then, the route selection circuit 204 changes the order of the output data of the XOR operator 202. The route selection circuit 204 changes the order of the data at random according to the inputted random number and outputs it to $S'_0$-$S'_3$. However, data masked by each of the mask values $c_0$-$c_3$ is inputted to $S'_0$-$S'_3$. In FIG. 26, the output data, $x_0 \oplus c_2$, $x_1 \oplus c_0$, $x_2 \oplus c_3$ and $x_3 \oplus c_1$ of the XOR operator 202 are re-arrayed in the order of $x_1 \oplus c_0$, $x_3 \oplus c_1$, $x_0 \oplus c_2$ and $x_2 \oplus c_3$ and are inputted to $S'_0$, $S'_1$, $S'_2$ and $S'_3$, respectively.

It is because the route selection circuit 204 performs the reverse conversion of the route selection circuit 203 that this order can be maintained. Since the route selection circuit 204 performs such conversion, the data order of mask values $c_0$-$c_3$, changed by the route selection circuit 203 is restored to the order of $c_0$, $c_1$, $c_2$ and $c_3$ when the data is inputted to the S-boxes.

Then, as a result of the S-box processes by $S'_0$, $S'_1$, $S'_2$ and $S'_3$, data masked by each of the mask values $d_0$, $d_1$, $d_2$ and $d_3$ are outputted. In FIG. 26, data $S[x_1] \oplus d_0$, $S[x_3] \oplus d_1$, $S[x_0] \oplus d_2$ and $S[x_2] \oplus d_3$ are outputted from $S'_0$, $S'_1$, $S'_2$ and $S'_3$, respectively.

By randomizing the order of these pieces of data using the route selection circuit 205, the data order with respect to $x_0$-$x_3$ is restored to the original order of $x_0$, $x_1$, $x_2$ and $x_3$, and the order of mask values added to these pieces of data is randomized instead. In FIG. 26, re-arrayed data $S[x_0] \oplus d_2$, $S[x_1] \oplus d_0$, $S[x_2] \oplus d_3$ and $S[x_3] \oplus d_1$ are outputted from the route selection circuit 205.

Since this series of processes can satisfy the data processing conditions of the mask method, the above-described Problem 1 can be solved. Since the necessary number of S-boxes is the same as in the case without DPA countermeasures and four and q times of S-box circuit as in Conventional method 1 is not needed, Problem 2 can be solved. Since the power consumption of both the Round Key process and Subbyte process in the round processing is randomized, Problem 3 can be solved. Furthermore, since a random number can be directly inputted to the route selection circuits 203-205 and no selection signal generation circuit is needed, Problem 4 can be solved.

As described above, the configuration of the encrypting circuit, shown in FIG. 26 can solve all the convention Problems 1-4. As the configuration of the route selection circuits 203-205, for solving Problem 4, a plurality of configurations can be considered. Therefore, each of the configurations is described below with reference to FIGS. 27-32.

Figure 27:
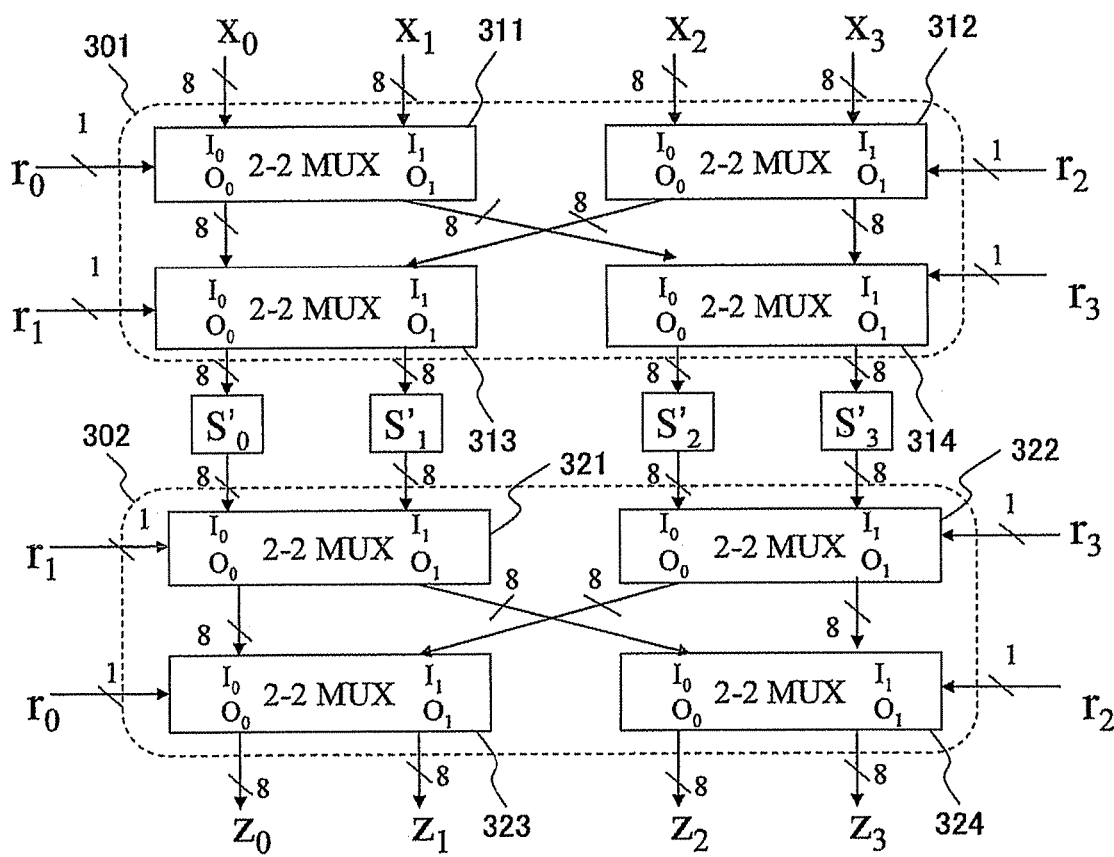
FIG. 27 shows the first configuration of the route selection circuit.

FIG. 27 shows the first configuration of the route selection circuits 204 and 205 shown in FIG. 26. Route selection circuits 301 and 302 correspond to the route selection circuits 204 and 205, respectively. The route selection circuit 203 has the same configuration as the route selection circuit 205. The route selection circuits 301 and 302 comprise 2-input/2-output switching circuits ((2-2) MUX) 311-314 and 321-324, respectively.

Figure 28:
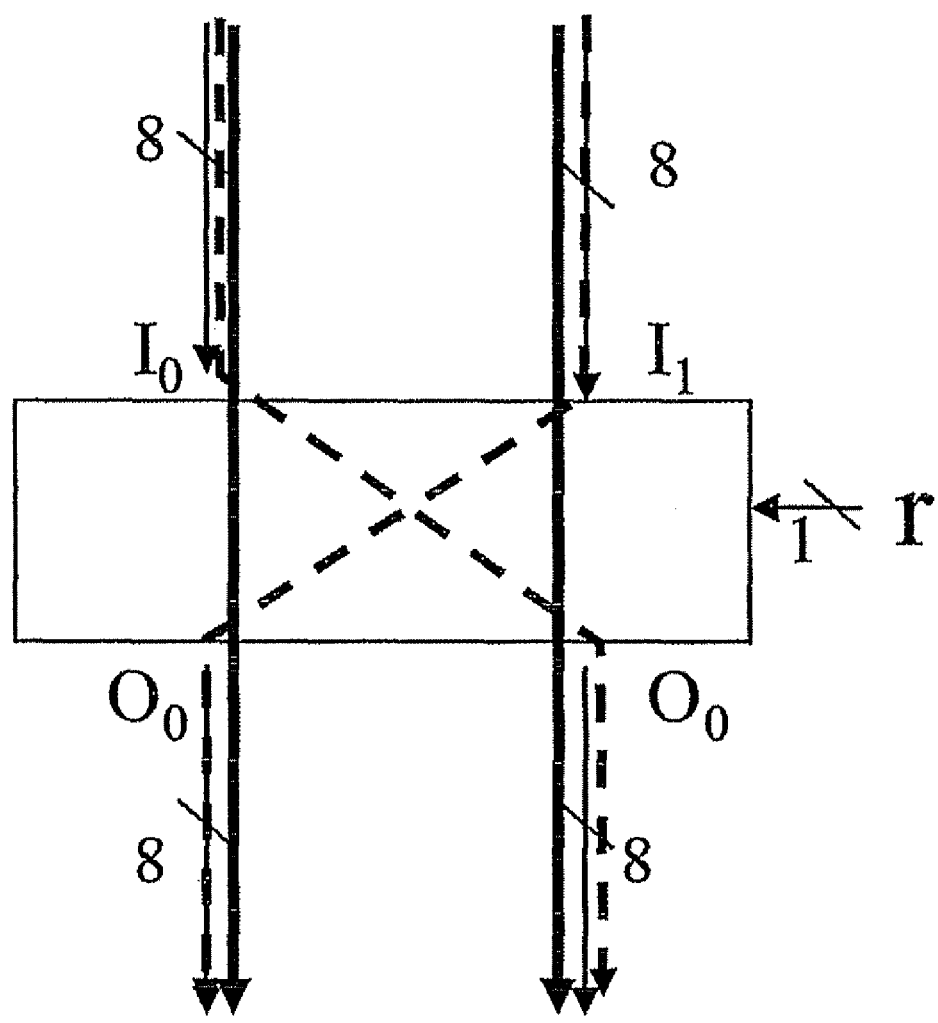
FIG. 28 shows a switching circuit.

Each of the switching circuits 311-314 and 321-324 comprises two 8-bit input units $I_0$ and $I_1$ and two 8-bit output unit $O_0$ and $O_1$ as shown in FIG. 28, and performs two types of switching according to a selection signal r.

One is performed in the case of r=0, and the switching of $O_0=I_0$ and $O_1=I_1$ is performed. The other is performed in the case of r=1, the switching of $O_0=I_1$ and $O_1=I_0$ is performed. Specifically, according to which the selection signal r is, 0 or 1, it is selected whether input data is outputted without being crossed or after being crossed. By building the route selection circuits 301 and 302 thus using such a switching circuit, a random number externally inputted can be used as a selection signal without being processed.

The operation of the route selection circuits 301 and 302 using the switching circuit shown in FIG. 28 is described below. Four pieces of 8-bit data, $x_0$, $x_1$, $x_2$ and $x_3$ are inputted to the route selection circuit 301 and four pieces of 8-bit data, $z_0$, $z_1$, $z_2$ and $z_3$ are outputted.

As shown in FIG. 27, the route selection circuit 301 comprises a first stage circuit obtained by arraying the switching circuits 311 and 312 in parallel and a second stage circuit obtained by arraying the switching circuits 313 and 314 in parallel. Input data is arrayed in the order of $x_0$, $x_1$, $x_2$ and $x_3$ from the highest order. $x_0$ and $x_1$ are inputted to the $I_0$ and $I_1$ of the switching circuit 311, respectively, and $x_2$ and $x_3$ are inputted to the $I_0$ and $I_1$ of the switching circuit 312, respectively.

The $O_0$ and $O_1$ of the switching circuit 311 are connected to the $I_0$ of the switching circuit 313 and $I_0$ Of the switching circuit 314, respectively. And the $O_0$ and $O_1$ of the switching circuit 312 are connected to the $I_1$ of the switching circuit 313 and $I_1$ of the switching circuit 314, respectively. Output data is outputted in the order of the $O_0$ and $O_1$ of the switching circuit 313 and the $O_0$ and $O_1$ of the switching circuit 314, respectively, from the highest order.

The configuration of the route selection circuit 302 is the same as that of the route selection circuit 301. The output data of the route selection circuit 302 is arrayed in the order of $z_0$, $z_1$, $z_2$ and $z_3$ from the highest order. $z_0$ and $z_1$ are outputted from the $O_0$ and $O_1$ of the switching circuit 323, respectively, and $z_2$ and $z_3$ are outputted from the $O_0$ and $O_1$ of the switching circuit 324, respectively.

Four 1-bit random numbers, $r_0$, $r_1$, $r_2$ and $r_3$ are externally inputted to each of the route selection circuits 301 and 302, and one bit of the random number is inputted to each switching circuit as a selection signal. However, the random numbers inputted to the route selection circuit 301 are reversed between the first and second stages and inputted to the route selection circuit 302.

Therefore, random numbers $r_0$, $r_1$, $r_2$ and $r_3$ are inputted to the switching circuits 311, 312, 313 and 314, respectively, and random numbers $r_1$, $r_3$, $r_0$ and $r_2$ are inputted to the switching circuits 321, 322, 323 and 324, respectively.

The route selection circuit 301 randomizes the order of data $x_0$-$x_3$ according to random numbers $r_0$-$r_3$, which is outputted to $S'_0$-$S'_3$. $S'_0$-$S'_3$ apply the non-linear conversion process to the randomized data, and the route selection circuit 302 restores the order of the converted data according to random numbers $r_1$, $r_3$, $r_0$ and $r_2$ to the state before the randomization.

In this case, the output destination of each piece of data $x_j$ inputted to the route selection circuit 301 is selected from $S'_0$-$S'_3$ at random according to the value of two bits of the random numbers $r_0$-$r_3$.

For example, firstly, $x_0$ is outputted from the $O_0$ or $O_1$ of the switching circuit 311 according to the value of random number $r_0$. When being outputted from $O_0$, $x_0$ is inputted to the switching circuit 313 connected to $S'_0$ and $S'_1$ and further is outputted to $S'_0$ or $S'_1$ according to the value of random number $r_1$. When being outputted from $O_1$ of the switching circuit 311, $x_0$ is inputted to the switching circuit 314 connected to $S'_2$ and $S'_3$ and further is outputted to $S'_2$ or $S'_3$ according to the value of random number $r_3$.

Specifically, the output destination of $x_0$ is selected from the left half of $S'_0$-$S'_3$ ($S'_0$ and $S'_1$) or the right half of $S'_0$-$S'_3$ ($S'_2$ and $S'_3$) at random by the first 1-bit random number $r_0$, and is further selected from the left half ($S'_0$ or $S'_2$) or the right half ($S'_1$ or $S'_3$) at random by the subsequent 1-bit random number $r_1$.

After the completion of the S-box process, by converting the data through the route selection circuit 302 whose configuration is reversed with the route selection circuit 301 between the first and second stages, the data order is restored to that before the data is randomized and $z_0$-$z_3$ are outputted.

Since four output destinations $S'_0$-$S'_3$ can be selected according to two bits of random number by using the configuration shown in FIG. 27, the output destination of $x_0$ can be uniformly selected from $S'_0$-$S'_3$ as long as there is no bias in the random number, thereby realizing the high security of DPA.

Figure 22:
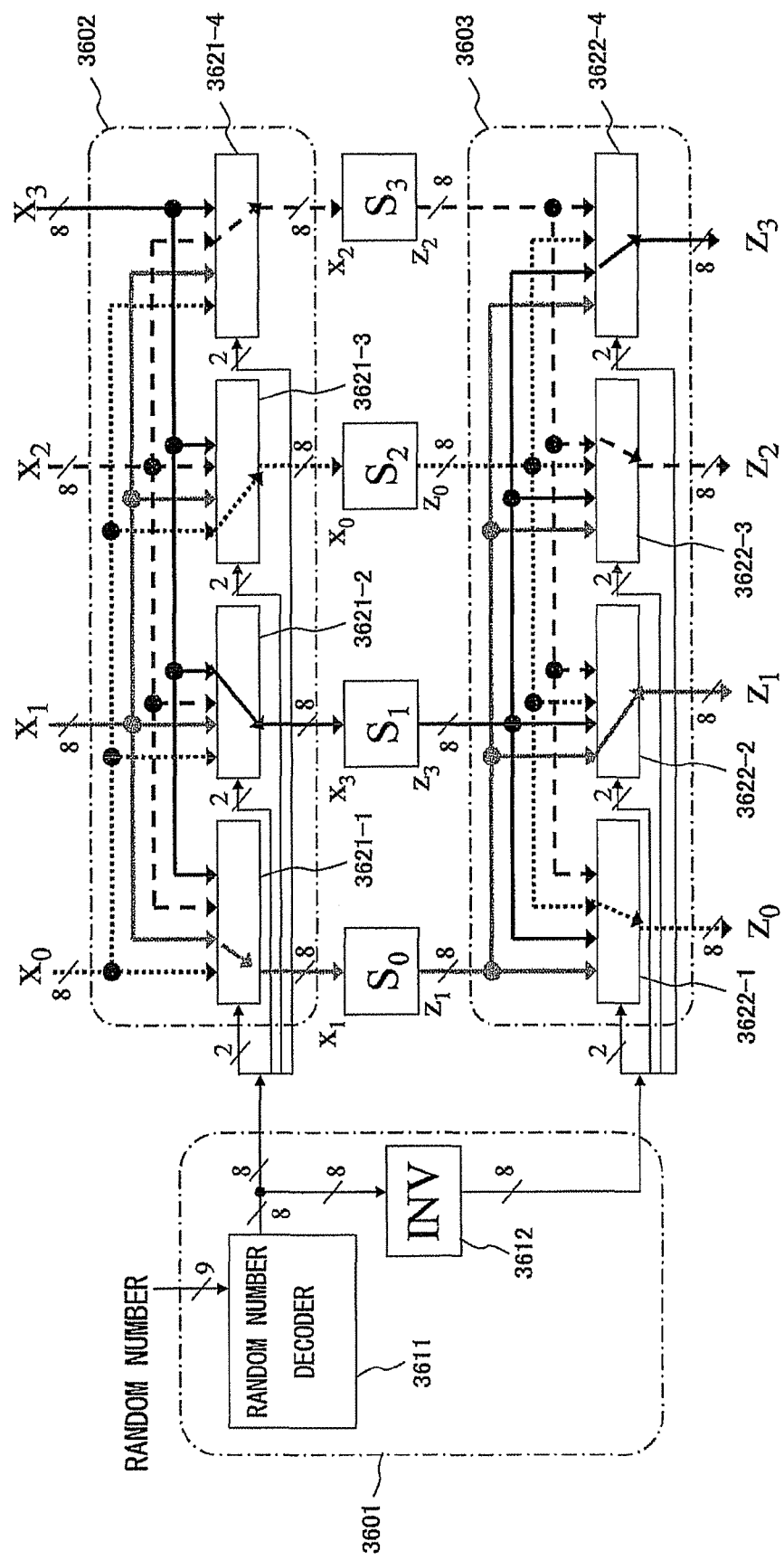
FIG. 22 shows the conventional route selection circuit.
Figure 23:
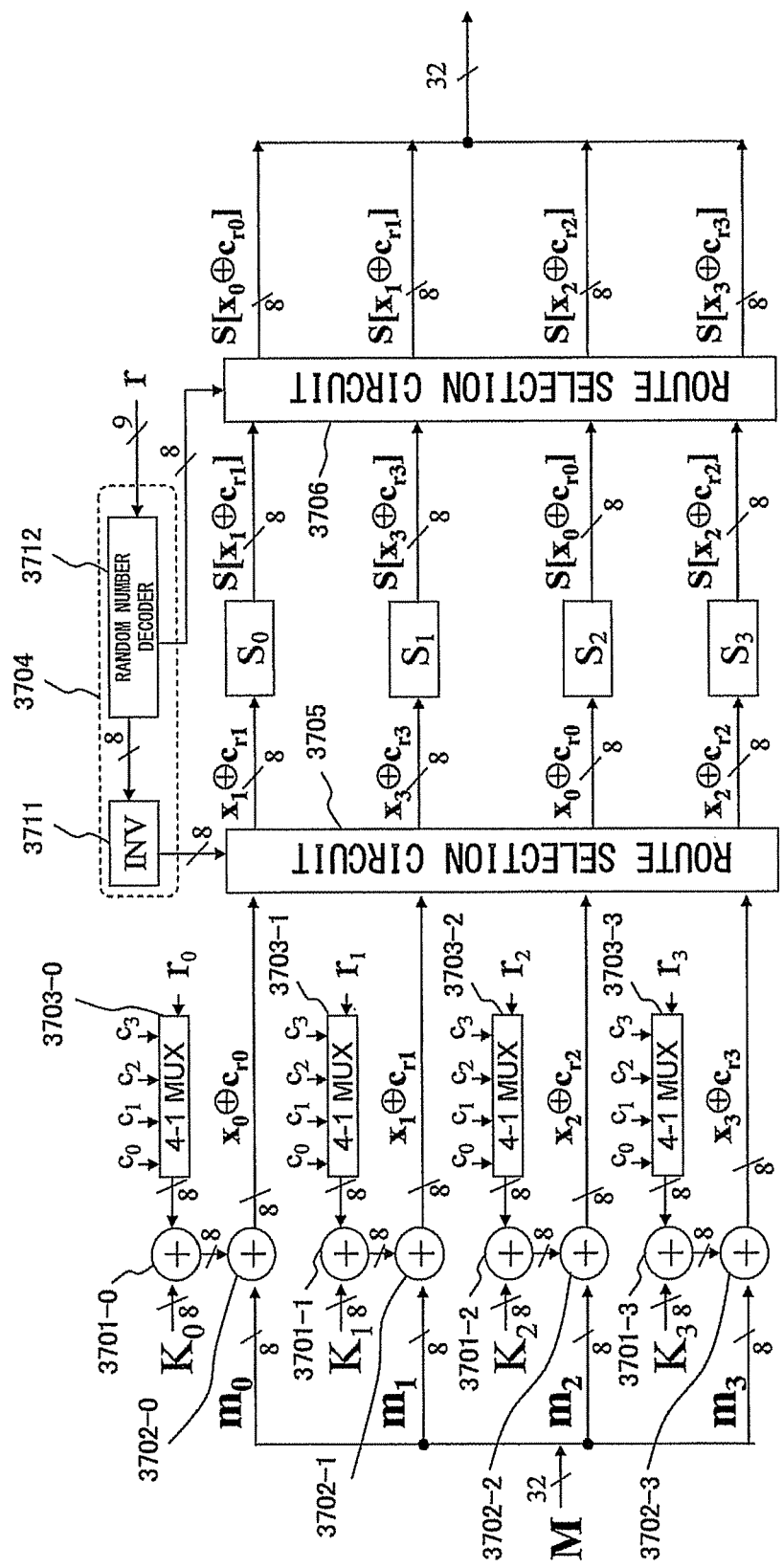
FIG. 23 shows the configuration of a first virtual encrypting circuit.

In the configuration of Conventional method 3 shown in FIG. 22, a selection signal must be generated from an inputted random number via a selection signal generation circuit in such a way that four switching circuits may not select the same data. While in the configuration shown in FIG. 27, since a 2-input/2-output switching circuit is used, as to any selection signal, the output data of the switching circuit never overlaps. Therefore, no circuit for generating a selection signal from a random number is needed.

Figure 30:
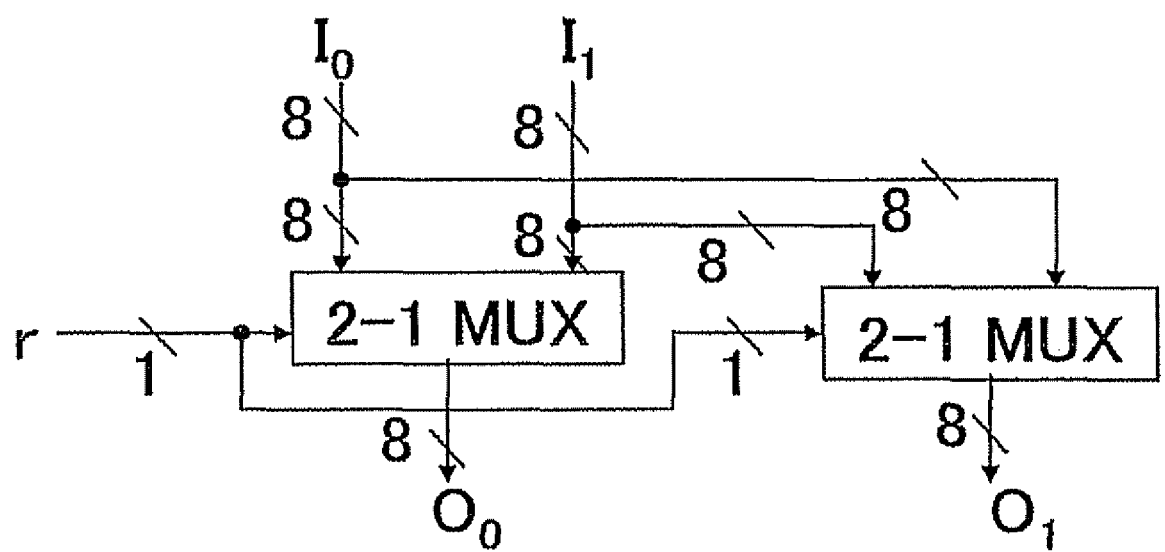
FIG. 30 shows the configuration of the switching circuit.

Furthermore, the configuration shown in FIG. 27 can reduce the area of the route selection circuit to ⅔ of that of the configuration shown in FIG. 22. While each of the route selection circuits 3602 and 3603 shown in FIG. 22 comprises four selectors (4-1 MUX) and each selector comprises three 2-input multiplexer circuits (2-1 MUX), as shown in FIG. 29. However, each of the route selection circuits 301 and 302 comprises four switching circuits (2-2 MUX) and each switching circuit comprises two 2-input multiplexer circuits, as shown in FIG. 30.

Therefore, while in order to build the route selection circuits 3602 and 3603 shown in FIG. 22, 12 2-input multiplexer circuits are needed, in order to build the route selection circuits 301 and 302 shown in FIG. 27, only 8 2-input multiplexer circuits are needed.

As described above, by building a route selection circuit using a 2-input/2-output switching circuit as unit, input data is uniformly distributed to $S'_0$-$S'_3$. Therefore, the secure encrypting process of DPA can be realized and also no selection signal generation circuit is needed, thereby solving Problem 4.

Since the route selection circuits 301 and 302 shown in FIG. 27 randomize data order according to four bits of random numbers, $2^4=16$ kinds of re-array can be performed. This number is smaller than $4!=1\times2\times3\times4=24$, which is the total number of the re-array patterns of four pieces of data can be re-arrayed differently. The more the total number of re-array is, the more the number of the random change patterns of power consumption becomes. In this case, therefore, the change pattern is difficult to anticipate and security can be further improved. Therefore, it is preferable to perform the total 24 kinds of re-array patterns according to a random number.

Figure 31:
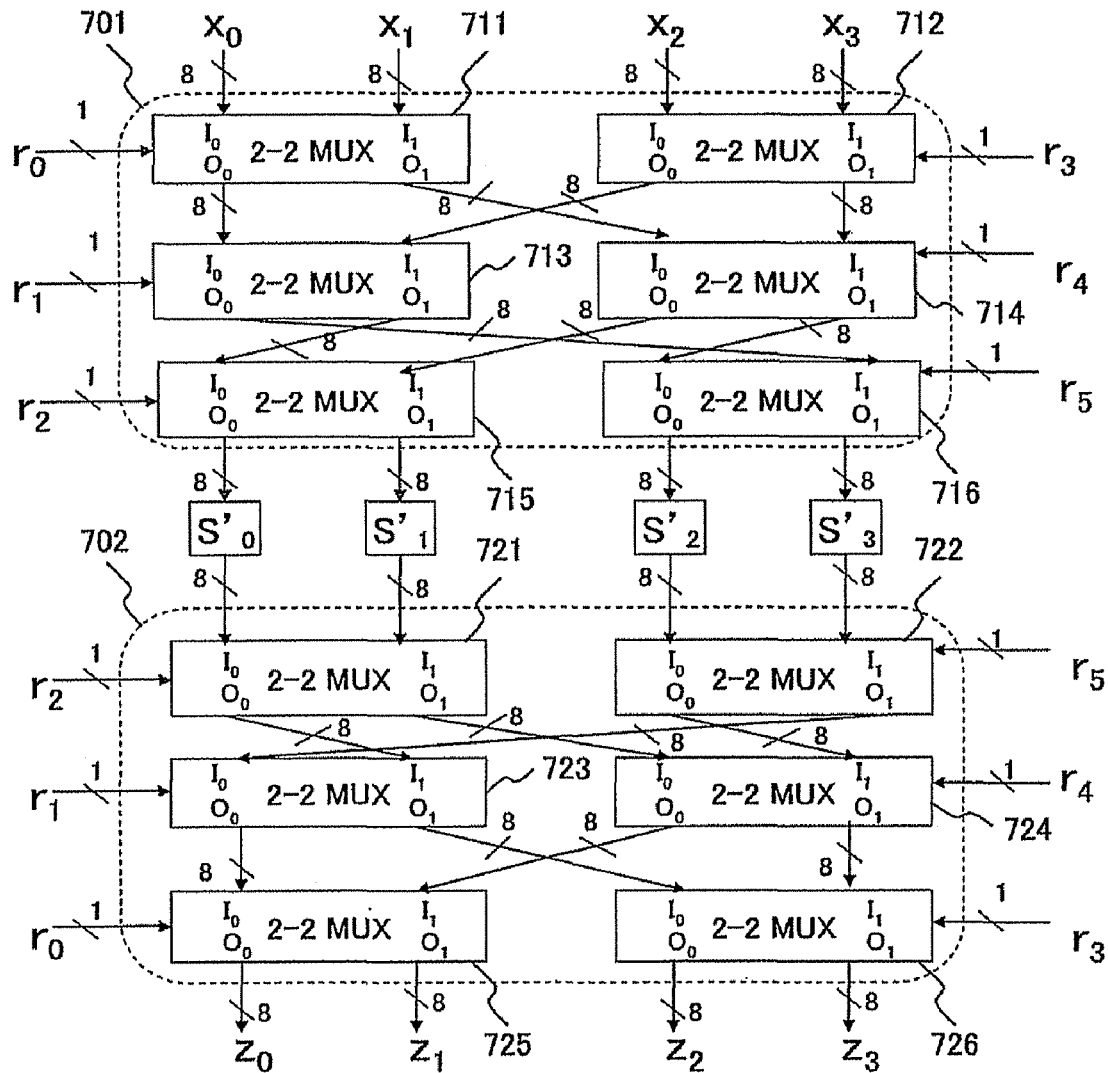
FIG. 31 shows the second configuration of the route selection circuit.

FIG. 31 shows the second configuration of the route selection circuits 204 and 205 shown in FIG. 26, which can perform 24 kinds of re-array. The route selection circuits 701 and 702 correspond to the route selection circuits 204 and 205, respectively. The route selection circuit 203 has the same configuration as the route selection circuit 205. The route selection circuits 701 and 702 comprise 2-input/2-output switching circuits (2-2MUX) 711-716 and 721-726, respectively. The respective operations of the switching circuits 711-716 and 721-726 are the same as that shown in FIG. 28.

Four pieces of 8-bit data $x_0$, $x_1$, $x_2$ and $x_3$ are inputted to the route selection circuit 701, and four pieces of 8-bit data $z_0$, $z_1$, $z_2$ and $z_3$ are outputted from the route selection circuit 702.

As shown in FIG. 31, the route selection circuit 701 comprises a first stage circuit in which the switching circuits 711 and 712 are arrayed in parallel, a second stage circuit in which the switching circuits 713 and 714 are arrayed in parallel and a third stage circuit in which the switching circuits 715 and 716 are arrayed in parallel. Input data is arrayed in the order of $x_0$, $x_1$, $x_2$ and $x_3$ from the highest order. $x_0$ and $x_1$ are inputted to the $I_0$ and $I_1$, respectively, of the switching circuit 711, and $x_2$ and $x_3$ are inputted to the $I_0$ and $I_1$, respectively, of the switching circuit 712.

The $O_0$ and $O_1$ of the switching circuit 711 are connected to the $I_0$ of the switching circuit 713 and the $I_0$ of the switching circuit 714, respectively, and the $O_0$ and $O_1$ of the switching circuit 712 are connected to the $I_1$ of the switching circuit 713 and the $I_1$ of the switching circuit 714, respectively. The $O_0$ and $O_1$ of the switching circuit 713 are connected to the $I_1$ of the switching circuit 716 and the $I_0$ of the switching circuit 715, respectively, and the $O_0$ and $O_1$ of the switching circuit 714 are connected to the $I_1$ of the switching circuits 715 and the $I_0$ of the switching circuit 716, respectively. Output data is outputted in the order of the $O_0$ and $O_1$ of the switching circuit 715 and the $O_0$ and $O_1$ of the switching circuit 716 from the highest order.

The route selection circuit 702 comprises a first stage circuit in which the switching circuits 721 and 722 are arrayed in parallel, a second stage circuit in which the switching circuits 723 and 724 are arrayed in parallel and a third stage circuit in which the switching circuits 725 and 726 are arrayed in parallel. Data outputted from $S'_0$ and $S'_1$ are inputted to the $I_0$ and $I_1$, respectively, of the switching circuit 721, and data outputted from $S'_2$ and $S'_3$ are inputted to the $I_0$ and $I_1$, respectively, of the switching circuit 722.

The $O_0$ and $O_1$ of the switching circuit 721 are connected to the $I_1$ of the switching circuit 723 and the $I_0$ of the switching circuit 724, respectively, and the $O_0$ and $O_1$ of the switching circuit 722 are connected to the $I_1$ of the switching circuit 724 and the $I_0$ of the switching circuit 723, respectively. The $O_0$ and $O_1$ of the switching circuit 723 are connected to the $I_0$ of the switching circuit 725 and the $I_0$ of the switching circuit 726, respectively, and the $O_0$ and $O_1$ of the switching circuit 724 are connected to the $I_1$ of the switching circuit 725 and the $I_1$ of the switching circuit 726, respectively.

Output data is arrayed in the order of $z_0$, $z_1$, $z_2$ and $z_3$ from the highest order. $z_0$ and $z_1$ are outputted from the $O_0$ and $O_1$, respectively, of the switching circuit 725, and $z_2$ and $z_3$ are outputted from the $O_0$ and $O_1$, respectively, of the switching circuit 726.

Six pieces of 1-bit random numbers $r_0$, $r_1$, $r_2$, $r_3$, $r_4$ and $r_5$ are externally inputted to each of the route selection circuits 701 and 702, and one bit of random number is inputted to each switching circuit as a selection signal. However, in this case, to the route selection circuit 702, the random numbers inputted to the route selection circuit 701 are reversed between the first and third stages and are inputted.

Therefore, the random numbers $r_0$, $r_1$, $r_2$, $r_3$, $r_4$ and $r_5$ are inputted to the switching circuits 711, 713, 715, 712, 714 and 716, respectively, and the random numbers $r_2, r_5, r_1, r_4, r_0$ and $r_3$ are inputted to the switching circuits 721, 722, 723, 724, 725 and 726, respectively.

The route selection circuit 701 randomizes the order of data $x_0$-$x_3$ according to the random number $r_0$-$r_5$ and outputs them to $S'_0$-$S'_3$. $S'_0$-$S'_3$ apply the non-linear conversion process to the randomized data, and the route selection circuit 702 restores the order of the converted data to the original one according to the random numbers $r_0$-$r_5$.

The correspondence between the random numbers $r_0$-$r_5$ and the output data order of the route selection circuit 701 in this process is shown in FIG. 32. For example, if $r_0|r_1|r_2|r_3|r_4|r_5$=000000, data $x_0, x_1, x_2$ and $x_3$ are re-arrayed and as a result, $x_2, x_1, x_3$ and $x_0$ are outputted to $S'_0, S'_1, S'_2$ and $S'_3$, respectively.

Since $x_j$ is outputted to each of $S'_0$-$S'_3$ with probability of 1/4 according to the correspondence shown in FIG. 32, the uniform distribution of a random number can be obtained, thereby realizing the secure processing of DPA. Since there are 24 kinds of re-array patterns of data $x_0$-$x_3$, security higher than that of the configuration shown in FIG. 27 can be realized.

When compared with the configuration of Conventional method 3 shown in FIG. 22 as to circuit scale, the configuration shown in FIG. 31 requires no selection signal generation circuit. However, different from the configuration shown in FIG. 27, the circuit scale of each of the route selection circuits 701 and 702 is the same as that of Conventional method 3. While each of the route selection circuit 3602 and 3603 comprises four selectors, each of the route selection circuits 701 and 702 comprises six switching circuits. In this case, since it is found from FIGS. 29 and 30 that the ratio of circuit scale between the selector and the switching circuit is 3:2, the ratio of the entire route selection circuit between them is 4×3:6×2=12:12. Therefore, it is concluded that the circuit scale of both is the same.

Next, the AES round processing circuit using the encrypting circuit shown in FIG. 26 is described with reference to FIGS. 33-37.

Figure 33:
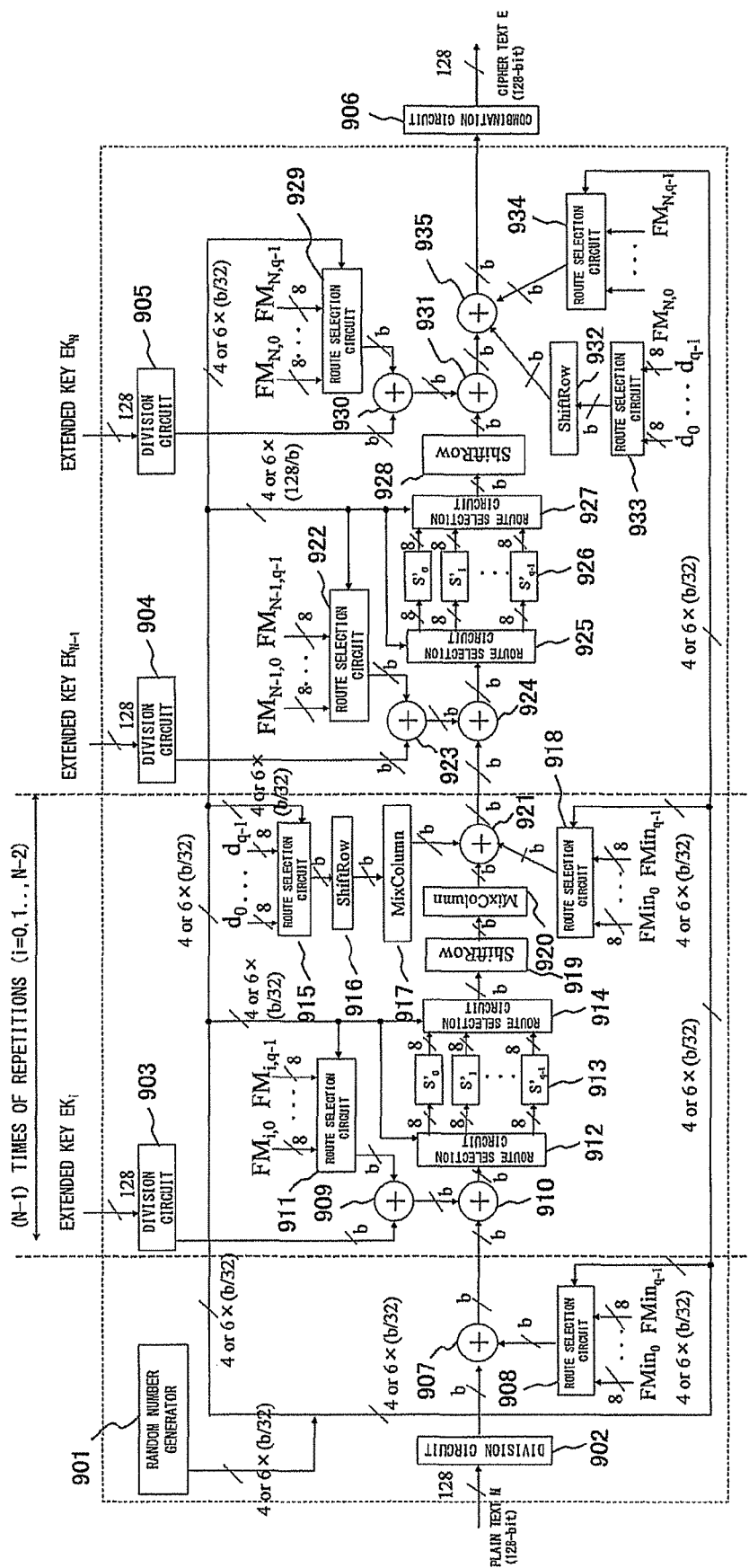
FIG. 33 shows the configuration of the AES round processing circuit of the present invention.

FIG. 33 shows an example of the configuration of such a round processing circuit. This round processing circuit comprises a random number generator 901, division circuits 902-905, a combination circuit 906, an XOR operators 907, 909, 910, 921, 923, 924, 930, 931 and 935, route selection circuits 908, 911, 912, 914, 915, 918, 922, 925, 927, 929, 933 and 934, S-box circuits 913 and 926, Shift Row circuits 916, 919, 928 and 932 and Mix-Column circuits 917 and 920. When 128-bit plain text M and (N+1) 128-bit extended key $EK_i$ (i=0, 1, . . . , N) are inputted, the round processing circuit outputs 128-bit cipher text E.

Although the AES rounding processing performs a process using 128 bits as unit in terms of algorithm, in terms of mounting, a form whose necessary circuit area is reduced by dividing the 128 bits every b bits and processing each b-bit is generally used. b=32, 64 or 128 are often used.

The division circuits 902-905 perform such bit division. In this case, after dividing the 128 bits of plain text M and the 128 bits of extended key $EK_i$ every b bits, these circuits perform the round processing. Then, after the completion of the round processing, the combination circuit 906 restores the data to 128 bits and outputs it as cipher text E.

This round processing is performed using different constant mask values $FMin_h, FM_{i,h}, c_h$ and $d_h$ (i=0, 1, . . . , N, h=0, 1, . . . , q−1), a masked S-box ($S'_h$) expressed by the following equation and a plurality of route selection circuits.

$$S'_h[x]=S[x\oplus c_h]\oplus d_h \qquad (17)$$

In the above equation, N indicates the number of the repetition of round processing and q indicates the number of constant mask values and S-boxes. Each of the S-box circuits 913 and 926 comprises q S-boxes ($S'_0$-$S'_{q-1}$) If b=32, 64 and 128, q=4, 8 and 16, respectively. It is assumed that the mask value meets the following conditions.

$$FMin_h\oplus FM_{i,h}=c_h \qquad (18)$$

(i=0, 1, . . . , N−1, h=0, 1, . . . , q−1)

If b=32, the route selection circuits 908, 911, 912, 914, 915, 918, 922, 925, 927, 929, 933 and 934 can be realized by the configuration shown in FIG. 27 or 31. In this case, the configuration of the route selection circuits 912 and 925 are the same as that of the route selection circuit 301 shown in FIG. 27 or the route selection circuit 702 shown in FIG. 31. The configurations of the route selection circuits 914 and 927 are the same as that of the route selection circuit 302 shown in FIG. 27 or the route selection circuit 702 shown in FIG. 31. The configurations of route selection circuits 908, 911, 915, 918, 922, 929, 933 and 934 are the same as that of the route selection circuit 914.

If b=64 or 128, a configuration obtained by combining a plurality of the configurations shown in FIG. 27 or 31 is needed. This configuration is described later.

The operation of the round processing circuit shown in FIG. 33 is described below. The random number generator 901 generates 4×(b/32)- or 6×(b/32)-bit random number and outputs it to all the route selection circuits 908, 911, 912, 914, 915, 918, 922, 925, 927, 929, 933 and 934. The route selection circuits 908, 911, 915, 918, 922, 929, 933 and 934 generate random mask values using this random number as a selection signal.

The division circuit 902 divides inputted plain text M every b bits and outputs them to the XOR operator 907. The route selection circuit 908 randomizes the order of the mask values $FMin_0$-$FMin_{q-1}$ according to the random number and outputs it to the XOR operator 909. The XOR operator 907 performs a mask process using the mask values $FMin_0$-$FMin_{q-1}$ by outputting the XOR of the output of the division circuit 902 and the output of the route selection circuit 908.

Then, the Round Key process is performed. In this process, the division circuit 903 divides the extended key $EK_i$ every b bits and outputs it to the XOR operator 909. The route selection circuit 911 randomizes the order of the mask values $FM_{i,0}$-$FM_{i,q-1}$ according to the random number and outputs it to the XOR operator 909. The XOR operator 909 performs a mask process using the mask values $FM_{i,0}$-$FM_{i,q-1}$ by outputting the XOR of the output of the division circuit 903 and the output of the route selection circuit 911. Then, the XOR operator 910 outputs the XOR of the output of the XOR operator 907 and the output of the XOR operator 909.

Then, the Sub-byte process is applied to the obtained result of the Round-Key process. In this process, the route selection circuit 912 randomizes the order of the data according to the random number and outputs it to the S-box circuit 913. $S'_0$-$S'_{q-1}$ output masked data obtained by the S-box process, and the route selection circuit 914 changes the data order according to the random number and outputs it.

The Shift-Row circuit 919 applies a Shift-Row process to the obtained result of the Sub-byte process. Furthermore, the Mix-Column circuit 920 applies the Mix-Column process to it. Then, both the obtained data is outputted to the XOR operator 921.

The route selection circuit 915 randomizes the order of the mask values $d_0$-$d_{q-1}$ according to the random number and outputs it to the Shift-Row circuit 916. The Shift-Row circuit 916 applies the Shift-Row process to this output. Furthermore, the Mix-Column circuit 917 applies the Mix-Column process to it. Then, both the obtained data is outputted to the XOR operator 921. The route selection circuit 918 randomizes the order of the mask values $FMin_0$-$FMin_{q-1}$ according to the random number and outputs it to the XOR operator 921.

The 3-input XOR operator 921 outputs the XOR of the output of the Mix-Column circuit 917, the output of the Mix-Column circuit 920 and the output of the route selection circuit 918. It is because of the restriction of mask values in the S-box circuit 913 that this XOR operation is necessary. Specifically, the restriction is that the mask values for the input of $S'_0$-$S'_{q-1}$ are obtained by randomizing the order of the constant $d_0$-$d_{q-1}$.

The output of the Mix-Column circuit 917 temporarily invalidates the mask of the output of $S'_0$-$S'_{q-1}$, and the output of the route selection circuit 918 provides a new mask. Therefore, the mask values for the output of the XOR operator 921 are obtained by randomizing the order of $FMin_0$-$FMin_{q-1}$.

A switching circuit, which is not shown in FIG. 33, feeds back the output of the XOR operator 921 to the input of the XOR operator 910, and in the output of the XOR operator 910, mask values are equal to a value obtained by randomizing the order of $FMin_0 \oplus FM_{i,0}$, $FMin_1 \oplus FM_{i,1}$, ..., $FMin_{q-1} \oplus FM_{i,q-1}$. According to equation (18), these are equal to values obtained by randomizing the order of $c_0$-$c_{q-1}$. Equation (18) also shows that not only a mask value after being fed back from the XOR operator 921 to the XOR operator 910 but also the mask values (i=0) of the data outputted from the XOR operator 907 to the XOR operator 910 are equal to the values obtained by randomizing the order of $c_0$-$c_{q-1}$.

After a series of loop processes composed of the Round-Key, Sub-byte, Shift-Row and Mix-Column is repeated N−1 times as to i=0~N−2, as the last process, the processes are performed in the order of Round-Key, Sub-byte, Shift-Row and Round-Key.

In the first Round-Key process, the division circuit 904 divides an extended key $EK_{N-1}$ every b bits and outputs it to the XOR operator 923. The route selection circuit 922 randomizes the order of mask values $FM_{N-1,0}$-$FM_{N-1,q-1}$ according to the random number and outputs it to the XOR operator 923. The XOR operator 923 performs the mask process using $FM_{N-1,0}$-$FM_{N-1,q-1}$ by outputting the XOR of the output of the division circuit 904 and the output of the route selection circuit 922. Then, the XOR operator 924 outputs the XOR of the output of the XOR operator 921 in the loop of i=N−2 and the output of the XOR operator 923.

Then, the Sub-byte process is applied to the obtained result of the Round-Key process. In this process, the route selection circuit 925 randomizes the order of the data according to the random number and outputs it to the S-box circuit 926. $S'_0$-$S'_{q-1}$ output masked data obtained by the S-box process, and the route selection circuit 927 changes the data order according to the random number and outputs it.

The Shift-Row circuit 928 applies the Shift-Row process to the obtained result of the Sub-byte process and outputs the obtained data to the XOR operator 931.

Then, in the subsequent Round-Key process, the division circuit 905 divides an extended key $EK_N$ every b bits and outputs it to the XOR operator 930. The route selection circuit 929 randomizes the order of mask values $FM_{N,0}$-$FM_{N,q-1}$ according to the random number and outputs it to the XOR operator 930. The XOR operator 930 performs the mask process using $FM_{N,0}$-$FM_{N,q-1}$ by outputting the XOR of the output of the division circuit 905 and the output of the route selection circuit 929. Then, the XOR operator 931 outputs the XOR of the output of the Shift-Row circuit 928 and the output of the XOR operator 930.

The route selection circuit 933 randomizes the order of mask values $d_0$-$d_{q-1}$ according to the random number and outputs it to the Shift-Row circuit 932. The Shift-Row circuit 932 applies the Shift-Row process to this output, and outputs the obtained data to the XOR operator 935. The route selection circuit 934 randomizes the order of the mask values $FM_{N,0}$-$FM_{N,q-1}$ according to the random number and outputs it to the XOR operator 935.

The 3-input XOR operator 935 outputs the XOR of the output of the XOR operator 931, the output of the Shift-Row circuit 932 and the output of the route selection circuit 934. The output of the Shift-Row circuit 932 is used to invalidate the mask of the output of $S'_0$-$S'_{q-1}$, and the output of the route selection circuit 934 is used to invalidate the masks by the route selection circuit 929. By invalidating these masks by the XOR operator 935, the masks of the data are released and the same process result as in the case without DPA countermeasures is obtained.

The combination circuit 906 combines 128/b process results obtained in b-bit units and outputs them as 128-bit cipher text E.

So far the basic operation of the round processing shown in FIG. 33 has been described, the specific configuration of the route selection circuit varies depending on the number b of bits, which is a processing unit. If b=32, as described above, the configuration shown in FIG. 27 or 31 can be used. If b=64 or 128, for example, the configuration shown in FIG. 34 can be used.

Figure 34:
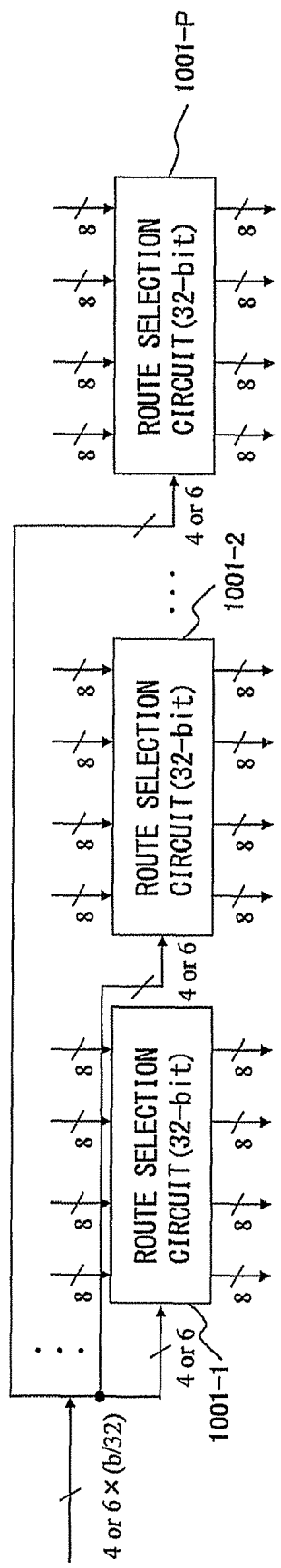
FIG. 34 shows the third configuration of the route selection circuit.

FIG. 34 shows the configuration in which p route selection circuits are arrayed in parallel when b=32. In this case, P=b/32 and 32-bit route selection circuits 1001-1~1001-P can array b-bit data at random according to a random number. The necessary bit length of the random number is 4×(b/32) bits when the 32-bit route selection circuit shown in FIG. 27 is used. It is 6×(b/32) bits when the 32-bit route selection circuit shown in FIG. 31 is used.

In the configuration shown in FIG. 34, the number of patterns in which power consumption is randomized is $16^{(b/32)}$ when the circuit shown in FIG. 27 is used for the 32-bit route selection circuit. Specifically, if b=64, it is $16^2=256$, and if b=128, it is $16^4=65536$. This number of patterns can be further increased by adding a 2-input/2-output switching circuit, thereby further increasing security.

Figure 36:
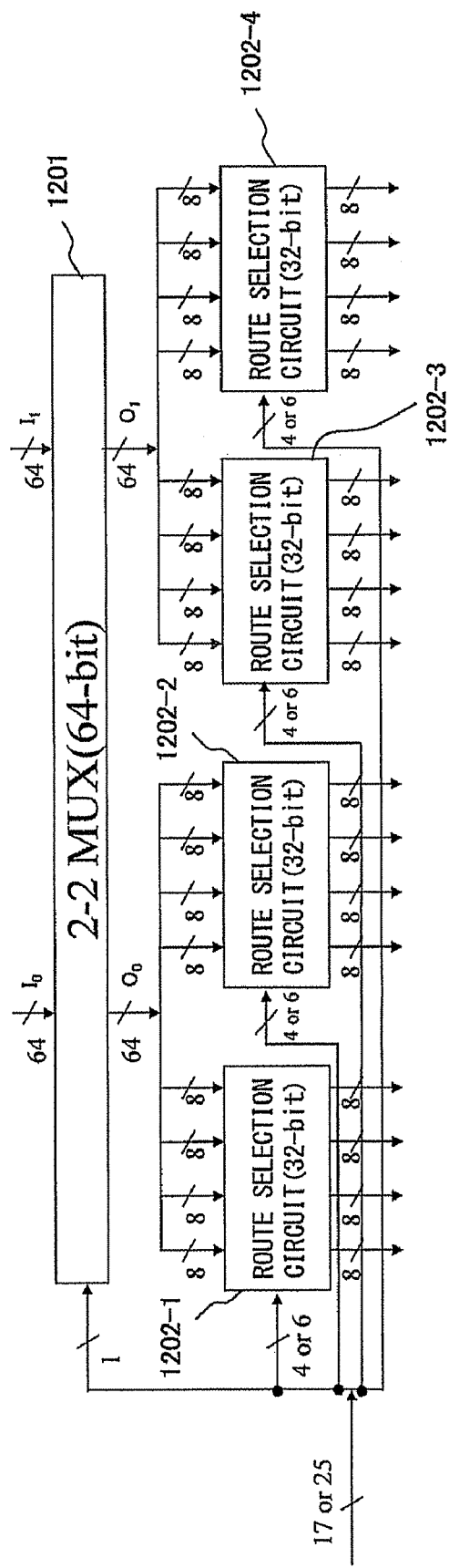
FIG. 36 shows the fifth configuration of the route selection circuit.

For example, if b=64 or 128, as shown in FIG. 35 or 36, the number of patterns can be doubled by adding one switching circuit. However, in this case, a random number including one extra bit must be inputted as a switching circuit selection signal.

If b=64, as shown in FIG. 35, the route selection circuit comprises a 2-input/2-output switching circuit 1101, two 32-bit route selection circuits 1102-1 and 1102-2. The switching circuit 1101 comprises two 32-bit input units $I_0$ and $I_1$, two 32-bit output units $O_0$ and $O_1$. If the 1-bit random number is 0, the switching of $O_0=I_0$ and $O_1=I_1$ is performed, and if the random number is 1, the switching of $O_0=I_1$ and $O_1=I_0$ is performed. Output data from $O_o$ and $O_1$ is outputted to the route selection circuits 1101-1 and 1102-2, respectively. Thus, the number of patterns becomes 256×2=512.

If b=128, as shown in FIG. 36, the route selection circuit comprises a 2-input/2-output switching circuit 1201, four 32-bit route selection circuits 1102-1 and 1102-4. The switching circuit 1201 comprises two 64-bit input units $I_0$ and $I_1$, two 64-bit output units $O_0$ and $O_1$. If the 1-bit random number is 0, the switching of $O_0=I_0$ and $O_1=I_1$ is performed, and if the random number is 1, the switching of $O_0=I_1$ and $O_0=I_0$ is performed.

Output data from $O_0$ is outputted to the route selection circuits 1201-2 and 1202-2, and output data from $O_1$ is outputted to the route selection circuits 1202-3 and 1202-4. Thus, the number of patterns becomes 65536×2=131972.

Furthermore, if b=128, as shown in FIG. 37, the number of patterns becomes 16 times by adding four switching circuits. However, in this case, a random number including four extra bits must be inputted as a switching circuit selection signal.

The route selection circuit shown in FIG. 37 comprises four 2-input/2-output switching circuits 1301-1~1301-4 and four 32-bit route selection circuits 1302-1~1302-4. The respective operation of the switching circuits 1301-1~1301-4 is the same as that of the switching circuit 1101 shown in FIG. 35. The switching circuits 1301-1 and 1301-2 arrayed in parallel in the first stage receive 128 bits of input data and the switching circuits 1301-3 and 1301-4 arrayed in parallel in the second stage output 128 bits of data to the route selection circuits 1302-1~1302-4.

Input data is arrayed in the order of the $I_0$ and $I_1$ of the switching circuit 1301-1 and the $I_0$ and $I_1$ of the switching circuit 1301-2 from the highest order. The $O_0$ and $O_1$ of the switching circuit 1301-1 are connected to the $I_0$ of the switching circuit 1301-3 and the $I_0$ of the switching circuit 1301-4, respectively, and the $O_0$ and $O_1$ of the switching circuit 1301-2 are connected to the $I_1$ of the switching circuit 1301-3 and the $I_1$ of the switching circuit 1301-4, respectively. Output data is outputted in the order of the $O_0$ and $O_1$ of the switching circuit 1301-3 and the $O_0$ and $O_1$ of the switching circuit 1301-4 from the highest order.

The output data from the $O_0$ and $O_1$ of the switching circuit 1301-3 are outputted to the route selection circuits 1302-1 and 1302-2, respectively, and the output data from the $O_0$ and $O_1$ of the switching circuit 1301-4 are outputted to the route selection circuits 1302-3 and 1302-4, respectively. Thus, the number of patterns becomes 65536×16=1048576.

Figure 1:
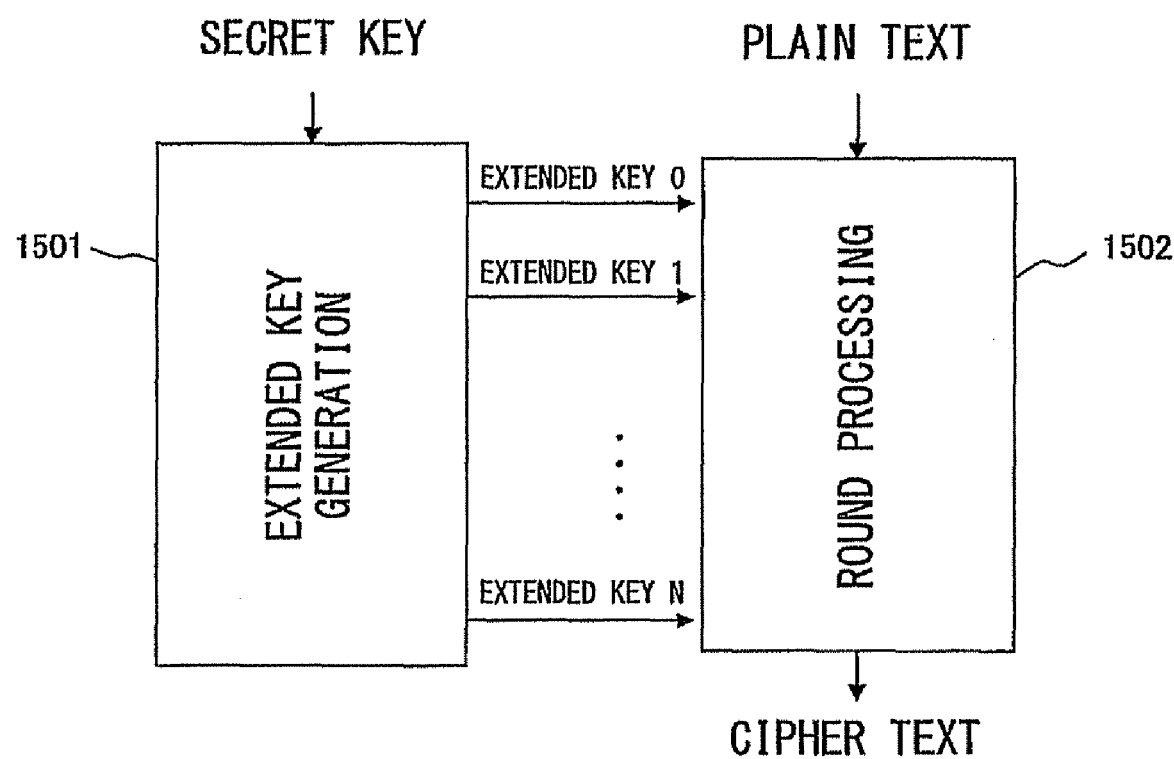
FIG. 1 shows the general configuration of a common key encrypting process.
Figure 2:
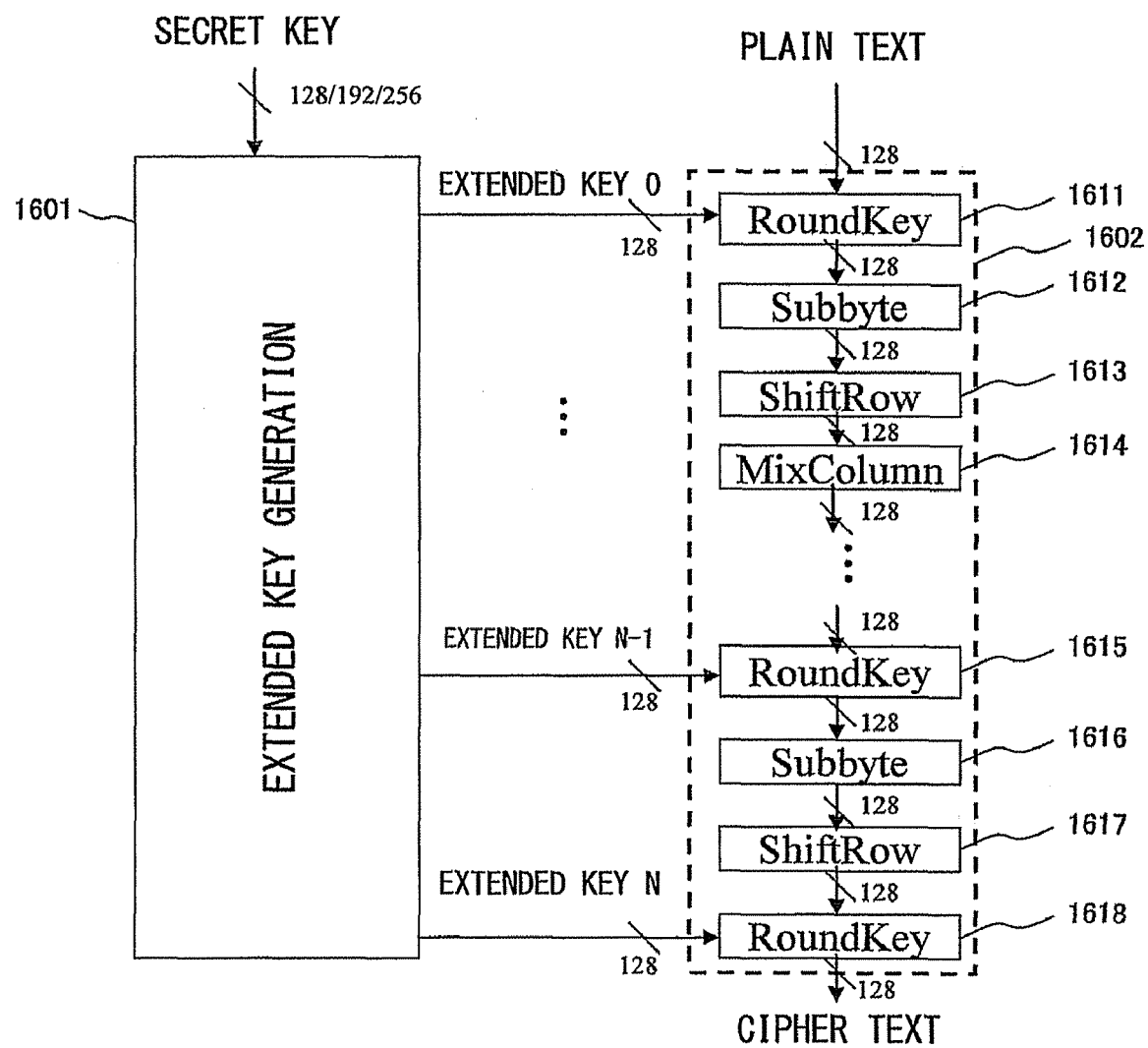
FIG. 2 shows the configuration of AES.
Figure 4:
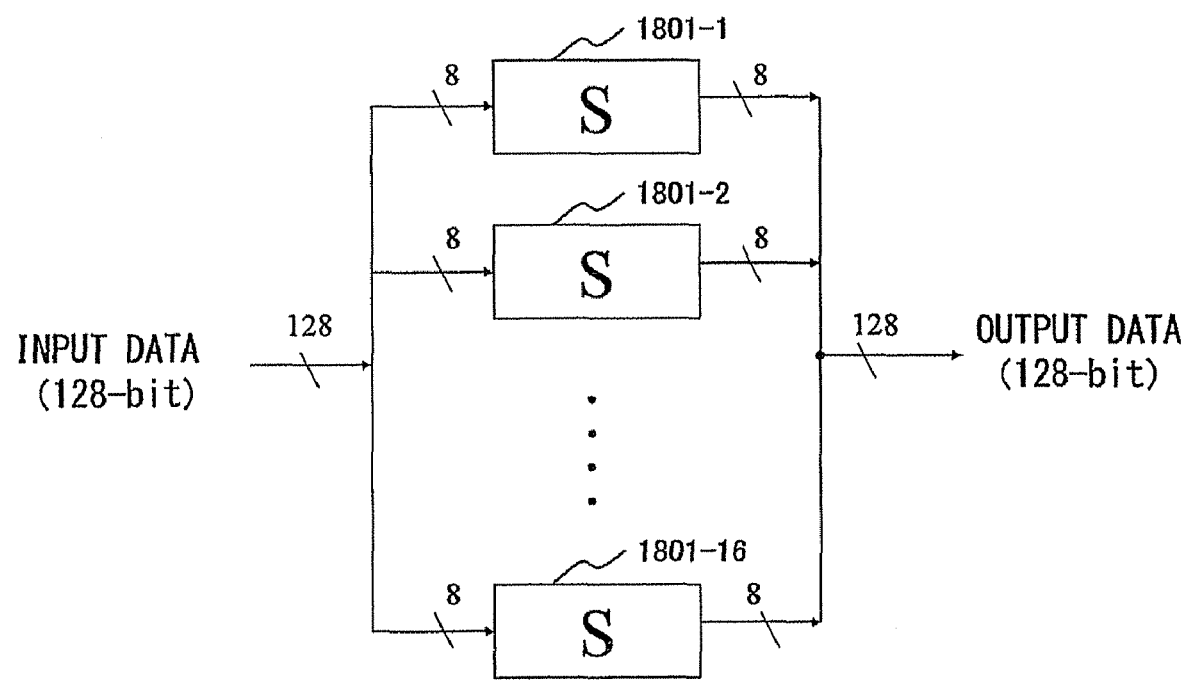
FIG. 4 shows the Sub-byte process in AES.
Figure 5:
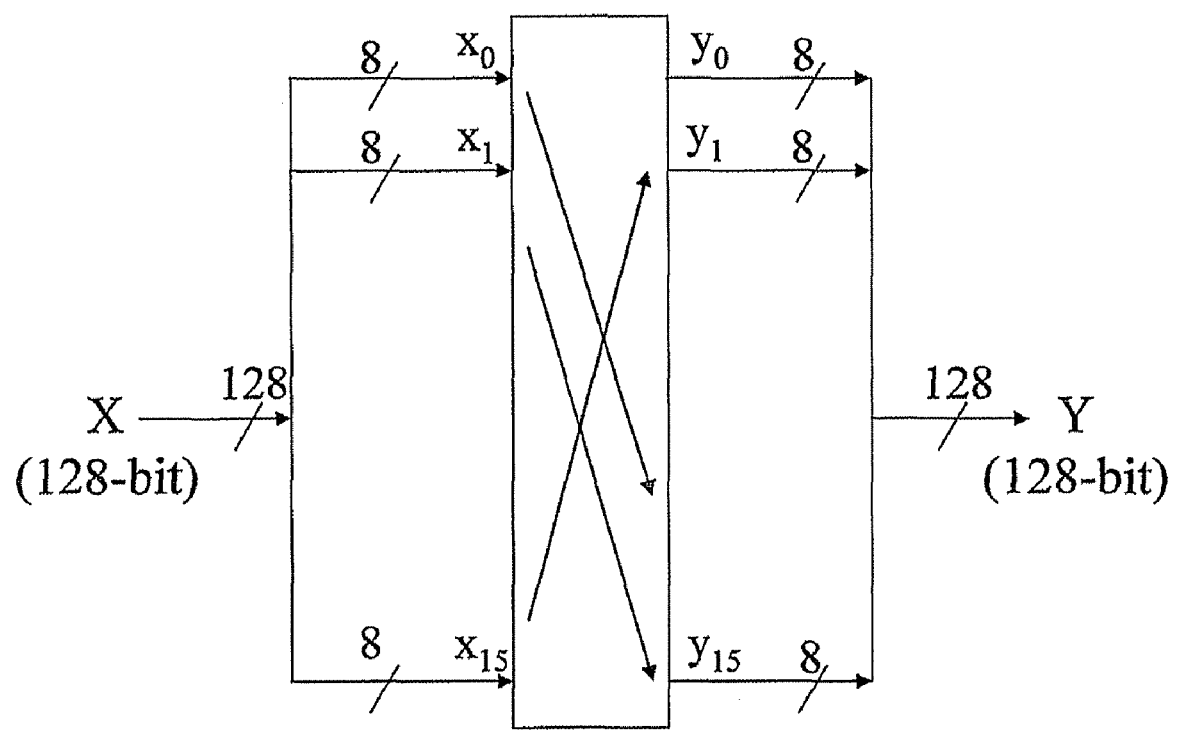
FIG. 5 shows the Shift Row process in AES.
Figure 9:
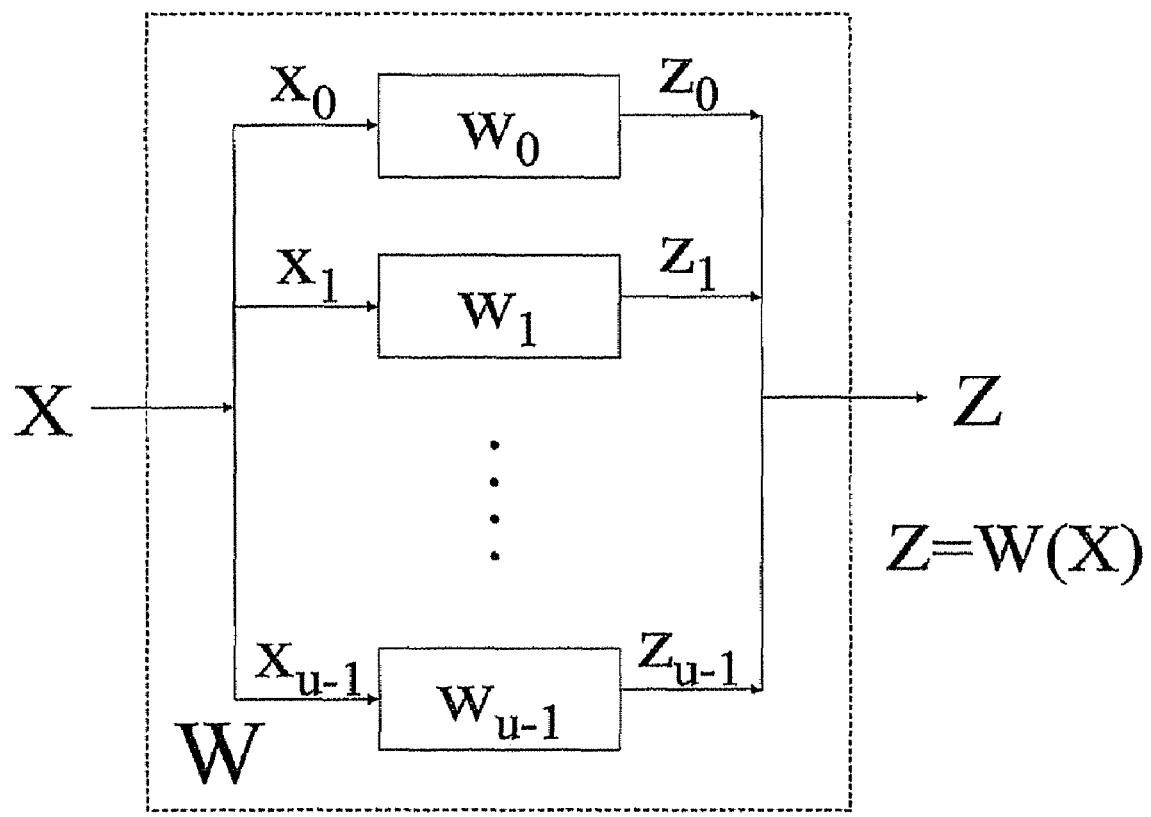
FIG. 9 shows the non-linear conversion process.
Figure 12:
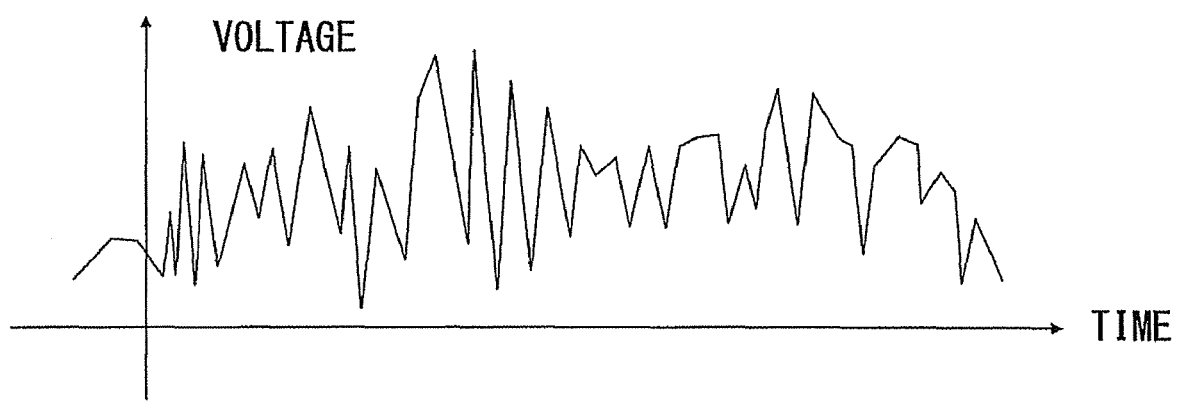
FIG. 12 shows the power consumption curve.
Figure 15:
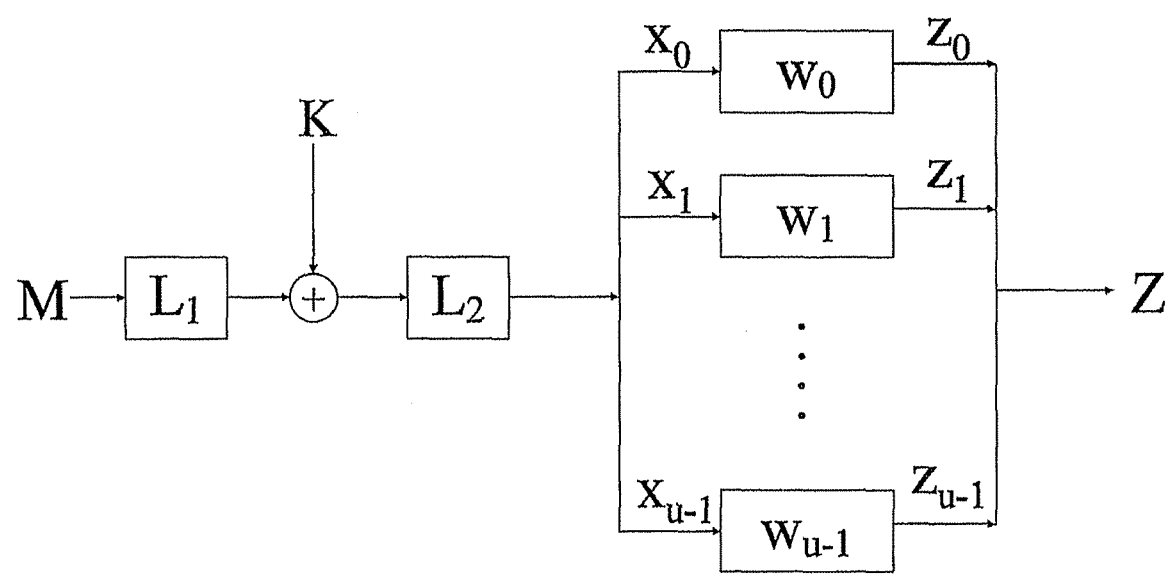
FIG. 15 shows a process obtained by combining the extended key XOR process, the linear conversion process and the non-linear conversion process.
Figure 16:
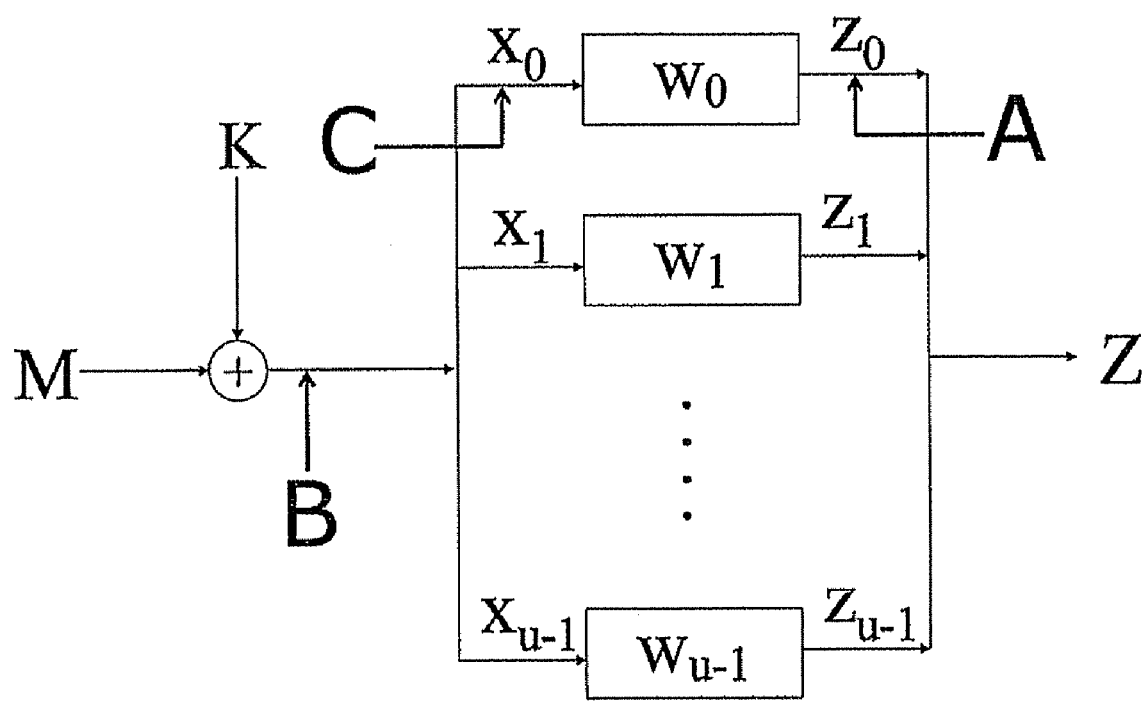
FIG. 16 shows the power measurement point.
Figure 21:
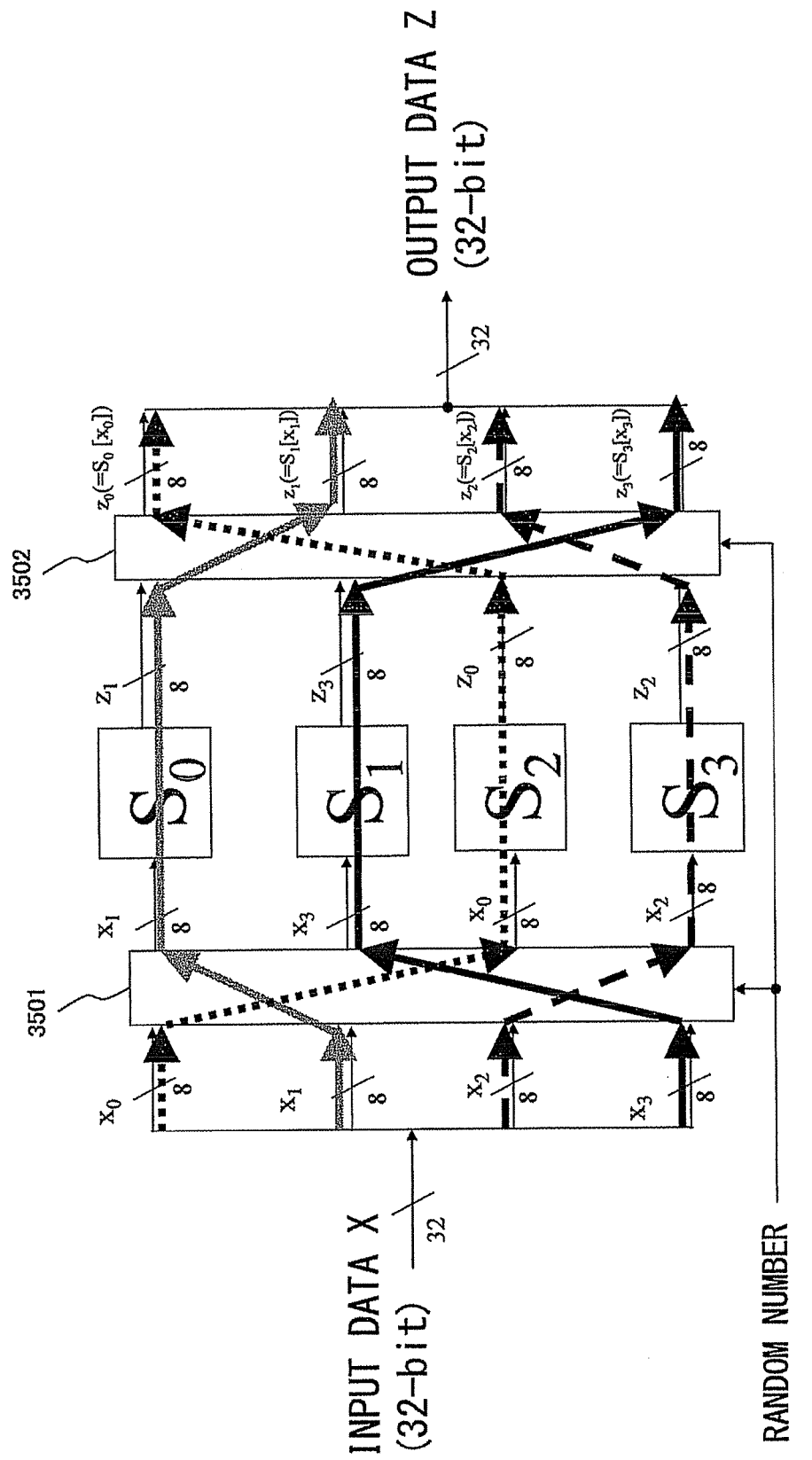
FIG. 21 shows a method for randomizing the power consumption of the Sub-byte process.

So far the AES round processing circuit has been described, the present invention is not limited to AES and is also applicable to other common key block cipher algorithms. If it is without DPA countermeasures, a target common key block cipher algorithm comprises the configuration shown in FIG. 10 or 15, and all non-linear conversion tables $w_0$-$w_{u-1}$ perform the same non-linear conversion.

As an algorithm meeting this condition, SC2000 is listed up besides AES. Because a configuration of a series of an I function and a B function in the first part of the encrypting process of SC2000 is equivalent of that shown in FIG. 15, in which all non-linear conversion tables $w_0$-$w_{u-1}$ are the same.

FIG. 38 shows the results of comparing the effects of the above-described Conventional methods 1-3 and those of the present invention shown in FIGS. 27, 31 and 34-37. By using the route selection circuits shown in FIGS. 27, 31 and 34-37, all of Problems 1-4 which Conventional methods 1-3 cannot solve can be solved.

What is claimed is:

1. An encrypting apparatus for performing an encryption process of a common key cipher, the encrypting apparatus comprising:
    a random number generation device configured to generate a random number;
    a first route selection device configured to re-array a data string including a plurality of pieces of data and composed of a plurality of extended key mask values for masking extended keys, at random in units of piece of data according to a value of the random number and to output the data string;
    an extended key operation device configured to generate an exclusive logical OR of a plurality of extended key mask values outputted from the first route selection device, a data string representing the extended keys and an input data string;
    a second route selection device configured to re-array a data string of the exclusive logical OR including a plurality of pieces of data by performing re-array conversely with the first route selection device in units of piece of data according to the value of the random number and to output the data string;
    a plurality of non-linear conversion circuits configured to receive the plurality of pieces of data of the data string outputted from the second route selection device, the number of the plurality of non-linear conversion circuits being equal to the number of the plurality of pieces of data, to apply non-linear conversion to the plurality of pieces of data, and to output a data string masked by a plurality of non-linear conversion mask values; and
    a third route selection device configured to re-array the data string outputted from the plurality of non-linear conversion circuits by performing the same re-array as the first route selection device in units of piece of data according to the value of the random number and to output the data string.

2. The encrypting apparatus according to claim 1, wherein the data string outputted from the plurality of non-linear conversion circuits represents an exclusive logical OR of a result of converting an exclusive logical OR of the data string outputted from the second route selection device and the plurality of extended key mask values by an unmasked non-linear conversion table and the plurality of non-linear conversion mask values.

3. The encrypting apparatus according to claim 2, wherein the plurality of extended key mask values are different from each other and the plurality of non-linear conversion mask values are different from each other.

4. The encrypting apparatus according to claim 1, wherein each of the first, second and third route selection devices comprises a plurality of switching devices and
    each of the switching devices comprising first and second input units and first and second output units and performing one of a first switching operation of outputting data inputted to the first input unit from the first output unit and outputting data inputted to the second input unit from the second output unit, and a second switching operation of outputting data inputted to the first input unit from the second output unit and outputting data inputted to the second output unit from the first output unit according to the value of the random number.

5. The encrypting apparatus according to claim 4, wherein the random number is composed of four values and the plurality of switching devices are composed of first, second, third and fourth switching devices each of which operates according to each of the four values of the random number,
    first and second output units of the first switching device are connected to a first input unit of the third switching device and a first input unit of the fourth switching device, respectively, and first and second output units of the second switching device are connected to a second input unit of the third switching device and a second input unit of the fourth switching device, respectively, and
    four pieces of data are inputted to the first and second input units of the first switching device and the first and second input units of the second switching unit, respectively, and four pieces of data are outputted from the first and second output units of the third switching device and the first and second output units of the fourth switching device, respectively.

6. The encrypting apparatus according to claim 4, wherein the random number is composed of six values and a plurality of switching devices included in the first and third route selection devices are composed of first, second, third, fourth, fifth and six switching devices each of which operates according to each of the six values of the random number, first and second output units of the first switching device are connected to a first input unit of the third switching device and a first input unit of the fourth switching device, respectively, and first and second output units of the second switching device are connected to a second input unit of the third switching device and a second input unit of the fourth switching device, respectively, first and second output units of the third switching device are connected to a second input unit of the sixth switching device and a first input unit of the fifth switching device, respectively, and first and second output units of the fourth switching device are connected to a second input unit of the fifth switching device and a first input unit of the sixth switching device, respectively, four pieces of data are inputted to the first and second input units of the first switching device and the first and second input units of the second switching unit, respectively, and four pieces of data are outputted from the first and second output units of the fifth switching device and the first and second output units of the sixth switching device, respectively, a plurality of switching devices included in the second route selection device are composed of seventh, eighth, ninth, tenth, eleventh and twelfth switching devices each of which operates according to each of the six values of the random number, first and second output units of the seventh switching device are connected to a second input unit of the ninth switching device and a first input unit of the tenth switching device, respectively, first and second output units of the eighth switching device are connected to a second input unit of the tenth switching device and a first input unit of the ninth switching device, respectively, first and second output units of ninth switching device are connected to a first input unit of the eleventh switching device and a first input unit of the twelfth switching device, respectively, and first and second output units of the tenth switching device are connected to a second input unit of the eleventh switching device and a second input unit of the twelfth switching device, respectively, and four pieces of data are inputted to the first and second input units of the seventh switching device and the first and second input units of the eighth switching device, respectively and four pieces of data are outputted from the first and second output units of the eleventh switching device and the first and second output units of the twelfth switching device, respectively.

7. The encrypting apparatus according to claim 1, further comprising:
a fourth route selection device for re-arraying a data string composed of a plurality of plain text mask values for masking plain text by performing the same re-array as the first route selection device according to the value of the random number;
a plain text operation device for generating an exclusive logical OR of the plurality of plain text mask values outputted from the fourth route selection device and a data string representing the plain text and outputting the exclusive logical OR to the extended key operation device as the input data string;
a first processing device for applying a shift-row process and a mix-column process to a data string outputted from the third route selection device; and
a mask operation device for generating an exclusive logical OR of a process result of the first processing device, a data string for releasing a mask of the process result of the first processing device and a plurality of new mask values, wherein
the data string outputted from the plurality of non-linear conversion circuits represents an exclusive logical OR of a result of converting an exclusive logical OR of the data string outputted from the second route selection device, the plurality of extended key mask values and the plurality of plain text mask values by an unmasked non-linear conversion table, and the plurality of non-linear conversion mask values, a data string of an exclusive logical OR, outputted from the mask operation device is fed back to the extended key operation device as the input data string, a loop process by the first route selection device, the extended key operation device, the second route selection device, the plurality of non-linear conversion circuits, the third route selection device, the first processing device and the mask operation device is repeatedly applied to each of (N−1) extended keys from the 0th through (N−2)th.

8. The encrypting apparatus according to claim 7, wherein the plurality of extended key mask values are different from each other, the plurality of plain text mask values are different from each other and the plurality of non-linear conversion mask values are different from each other.

9. The encrypting apparatus according to claim 7, further comprising:
a fifth route selection device for re-arraying the data string composed of the plurality of plain text mask values by performing the same re-array as the first route selection device according to the value of the random number and outputting an obtained data string to the mask operation device as the plurality of new mask values.

10. The encrypting apparatus according to claim 7, further comprising:
a sixth route selection device for re-arraying a data string composed of the plurality of non-linear conversion mask values by performing the same re-array as the first route selection device according to the value of the random number and outputting the data string; and
a second processing device for applying a shift-row process and a mix-column process to the data string outputted from the sixth route selection device and outputting an obtained process result to the mask operation device as the data string for releasing the mask.

11. The encrypting apparatus according to claim 7, further comprising:
a seventh route selection device for re-arraying a data string composed of a plurality of extended key mask values for masking (N−1)th extended key by performing the same re-array as the first route selection device according to the value of a random number and outputting the data string;
a first operation device for generating an exclusive logical OR of the plurality of extended key mask values outputted from the seventh route selection device, a data string representing the(N−1)th extended key and a data string of an exclusive logical OR outputted from the mask operation device in the loop process using the (N−2)th extended key;
an eighth route selection device for re-arraying a data string of the exclusive logical OR, outputted from the first operation device by performing re-array conversely with the first selection device according to the value of the random number and outputting the data string;
a latter-stage non-linear conversion device for applying non-linear conversion to the data string outputted from the eighth route selection device and outputting a data string masked by the plurality of non-linear conversion mask values;
a ninth route selection device for re-arraying the data string outputted from the latter-stage non-linear conversion device by performing the same re-array as the first route selection device according to the value of a random number and outputting the data string;
a third processing device for applying a shift-row process to the data string outputted from the ninth route selection device;
a tenth route selection device for re-arraying a data string composed of a plurality of extended key mask values for masking Nth extended key by performing the same re-array as the first route selection device according to the value of the random number and outputting the data string;
a second operation device for generating an exclusive logical OR of the plurality of extended key mask values outputted from the tenth route selection device, a data string representing the Nth extended key and a process result of the third processing device; and
a third operation device for generating an exclusive logical OR of a data string of the exclusive logical OR, outputted from the second operation device, a data string for releasing a mask of the process result of the third processing device and a data string for releasing a mask of the Nth extended key and outputting the exclusive logical OR as cipher text, wherein
the data string outputted from the latter-stage non-linear conversion device represents an exclusive logical OR of a result of converting an exclusive logical OR of the data string outputted from the eighth route selection device, the plurality of extended key mask values for masking the (N−1)th extended key mask values and the plurality of plain text mask values by the unmasked non-linear conversion table, and the plurality of non-linear conversion mask values.

12. The encrypting apparatus according to claim 11, further comprising:
an eleventh route selection device for re-arraying the data string composed of the plurality of extended key mask values for masking the Nth extended key by performing the same re-array as the first route selection device according to the value of the random number and outputting an obtained data string to the third operation device as the data string for releasing the mask of the Nth extended key.

13. The encrypting apparatus according to claim 11, further comprising:
a twelfth route selection device for re-arraying a data string composed of the plurality of non-linear conversion mask values by performing the same re-array as the first route selection device according to the value of the random number and outputting the data string; and
a fourth processing device for applying a shift-row process to the data string outputted from the twelfth route selection device and outputting an obtained process result to the third operation device as the data string for releasing the mask of the process result of the third processing device.

14. The encrypting apparatus according to claim 11, wherein
each of the first, second, third, fourth, seventh, eighth, ninth and tenth route selection devices comprises one or more unit data string route selection devices,
the unit data string route selection device comprises a plurality of switching devices,
each switching device comprises first and second input units and first and second output units and performs one of a first switching operation of outputting data inputted to the first input unit and data inputted to the second input unit from the first and second output units, respectively, and a second operation of outputting data inputted to the first input unit and data inputted to the second input unit from the second and first output units, respectively, according to the value of the random number.

15. The encrypting apparatus according to claim 14, wherein
four different ones of a plurality of values constituting the random number are inputted to each of the one or more unit data string route selection devices,
the plurality of switching devices are composed of first, second, third and fourth switching devices each of which operates according to each of the four values of the random number,
first and second output units of the first switching device are connected to a first input unit of the third switching device and a first input unit of the fourth switching device, respectively, first and second output units of the second switching device are connected to a second input unit of the third switching device and a second input unit of the fourth switching device, respectively, and
four pieces of data are inputted to the first and second input units of the first switching device and the first and second input units of the second switching device, respectively, and four pieces of data are outputted from first and second output units of the third switching device and first and second output units of the fourth switching device, respectively.

16. The encrypting apparatus according to claim 14, wherein
six different ones of a plurality of values constituting the random number are inputted to each of the one or more unit data string route selection device,
the plurality of switching devices included in the first, third, fourth, seventh, ninth and tenth route selection devices are composed of first, second, third, fourth, fifth and sixth switching devices each of which operates according to each of the six values of the random number,
first and second output units of the first switching device are connected to a first input unit of the third switching device and a first input unit of the fourth switching device, respectively, first and second output units of the second switching device are connected to a second input unit of the third switching device and a second input unit of the fourth switching device, respectively, first and second output units of the third switching device are connected to a second input unit of the sixth switching device and a first input unit of the fifth switching device, respectively, and first and second output units of the fourth switching device are connected to a second input unit of the fifth switching device and a first input unit of the sixth switching device, four pieces of data are inputted to the first and second input units of the first switching device and the first and second input units of the second switching device, respectively, and four pieces of data are outputted from first and second output units of the fifth switching device and first and second output units of the sixth switching device, respectively, the plurality of switching devices included in the second, and eighth route selection devices are composed of seventh, eighth, ninth, tenth, eleventh and twelfth switching devices each of which operates according to each of the six values of the random number, first and second output units of the seventh switching device are connected to a second input of the ninth switching device and a first input of the tenth switching device, respectively, first and second output units of the eighth switching device are connected to a second input unit of the tenth switching device and a first input unit of the ninth switching device, respectively, first and second output units of the ninth switching device are connected to a first input unit of the eleventh switching device and a first input unit of the twelfth switching device, respectively, and first and second output units of the tenth switching device are connected to a second input unit of the eleventh switching device and a second input unit of the twelfth switching device, and four pieces of data are inputted to the first and second input units of the seventh switching device and the first and second input units of the eighth switching device, respectively, and four pieces of data are outputted from first and second output units of the eleventh switching device and first and second output units of the twelfth switching device, respectively.

17. The encrypting apparatus according to claim 14, wherein each of the first, second, third, fourth, seventh, eighth, ninth and tenth route selection devices comprises a plurality of unit data string route selection devices and a switching device for dividing a data string to be inputted to the plurality of unit data string route selection devices into two parts each composed of one or more unit data strings, changing an order of the two parts according to one of a plurality of values constituting the random number and outputting an obtained data string to the plurality of unit data string route selection devices.

18. The encrypting apparatus according to claim 14, wherein each of the first, second, third, fourth, seventh, eighth, ninth and tenth route selection devices comprises four unit data string route selection devices and a switching device for dividing a data string to be inputted to the four unit data string route selection devices into four unit data strings, changing an order of the four unit data strings according to a part of a plurality of values constituting the random number and outputting an obtained data string to the four unit data string route selection devices.

* * * * *